United States Patent
Takechi et al.

(10) Patent No.: US 11,975,403 B2
(45) Date of Patent: *May 7, 2024

(54) LASER PROCESSING APPARATUS, LASER PROCESSING METHOD, AND CORRECTION DATA GENERATION METHOD

(71) Applicant: PANASONIC INTELLECTUAL PROPERTY MANAGEMENT CO., LTD., Osaka (JP)

(72) Inventors: Yohei Takechi, Osaka (JP); Jun Yokoyama, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 765 days.

This patent is subject to a terminal disclaimer.

(21) Appl. No.: 16/995,153

(22) Filed: Aug. 17, 2020

(65) Prior Publication Data

US 2021/0053149 A1 Feb. 25, 2021

(30) Foreign Application Priority Data

Aug. 23, 2019 (JP) ................................ 2019-152889

(51) Int. Cl.
*B23K 26/06* (2014.01)
*B23K 26/082* (2014.01)
(Continued)

(52) U.S. Cl.
CPC ...... *B23K 26/0643* (2013.01); *B23K 26/0648* (2013.01); *B23K 26/0665* (2013.01);
(Continued)

(58) Field of Classification Search
CPC ................ B23K 26/082; B23K 26/362; B23K 2101/34; B23K 2103/42; B23K 26/0006;
(Continued)

(56) References Cited

U.S. PATENT DOCUMENTS 5,097,291 A * 3/1992 Suzuki ............... G03F 7/70558
355/53
8,735,768 B2 5/2014 Urashima et al.
(Continued)

FOREIGN PATENT DOCUMENTS

CN 111940910 A 11/2020
JP 2004-074166 A 3/2004
(Continued)

OTHER PUBLICATIONS

JP 2015196169 (Year: 2015).*
(Continued)

*Primary Examiner* — Vy T Nguyen
(74) *Attorney, Agent, or Firm* — Rimon P.C.

(57) ABSTRACT

Laser processing apparatus includes movable mirror for changing paths of laser light for processing and measurement light, and stage for changing an incident angle of measuring light. Furthermore, laser processing apparatus includes lens for condensing laser light for processing and measurement light on processing point, controller for controlling laser oscillator, movable mirror, and stage based on corrected data for processing, and measurement processor for measuring a depth of keyhole generated at processing point. The corrected data for processing is data corrected so as to a deviation of an arrival position of at least one of laser light for processing and measurement light caused by chromatic aberration of lens on the surface of workpiece. With this configuration, an accurate depth of keyhole can be measured.

9 Claims, 16 Drawing Sheets

(51) Int. Cl.
    *B23K 26/21*     (2014.01)
    *B23K 26/70*     (2014.01)
(52) U.S. Cl.
    CPC .......... *B23K 26/082* (2015.10); *B23K 26/705* (2015.10); *B23K 26/21* (2015.10)
(58) Field of Classification Search
    CPC .. B23K 26/032; B23K 26/064; B23K 26/127; B23K 2101/006; B23K 2103/10; B23K 2103/16; B23K 2103/54; B23K 26/00; B23K 26/042; B23K 26/046; B23K 26/0604; B23K 26/0622; B23K 26/0624; B23K 26/08; B23K 26/083; B23K 26/0869; B23K 26/0884; B23K 26/352; B23K 26/38; B23K 26/402; B23K 37/0294; G01H 9/00; G02B 19/0009; G02B 19/0014; G02B 19/0047; G02B 26/06; G02B 26/0816; G02B 3/14; G02F 1/294
    USPC ................ 219/121; 359/642, 355, 577, 838; 700/166; 356/124
    See application file for complete search history.

(56) References Cited

U.S. PATENT DOCUMENTS

| | | | |
|---|---|---|---|
| 8,735,770 B2 | 5/2014 | Kuno et al. | |
| 8,822,875 B2 | 9/2014 | Webster et al. | |
| 9,457,428 B2 | 10/2016 | Webster et al. | |
| 9,492,889 B2 | 11/2016 | Suzuki et al. | |
| 10,022,818 B2 | 7/2018 | Webster et al. | |
| 10,124,410 B2 | 11/2018 | Kanko et al. | |
| 2012/0138586 A1 | 6/2012 | Webster et al. | |
| 2014/0153085 A1 | 6/2014 | Dobbie | |
| 2016/0039045 A1 | 2/2016 | Webster | |
| 2017/0326669 A1 | 11/2017 | Moser et al. | |
| 2018/0290235 A1 | 10/2018 | Webster et al. | |
| 2020/0361038 A1 | 11/2020 | Takechi et al. | |
| 2021/0205920 A1* | 7/2021 | Shiraishi | B23K 26/402 |
| 2021/0247366 A1* | 8/2021 | Nishikino | G01N 29/2418 |
| 2021/0276122 A1* | 9/2021 | Kawamura | G02B 26/0816 |
| 2021/0323088 A1* | 10/2021 | Yokoyama | B23K 26/032 |
| 2022/0355412 A1* | 11/2022 | Sato | B23K 26/082 |

FOREIGN PATENT DOCUMENTS

| | | |
|---|---|---|
| JP | 2008-030109 A | 2/2008 |
| JP | 2008-110400 A | 5/2008 |
| JP | 2012-236196 A | 12/2012 |
| JP | 2013-501964 A | 1/2013 |
| JP | 2013-545613 A | 12/2013 |
| JP | 2015-196169 A | 11/2015 |
| JP | 2018-501964 A | 1/2018 |
| WO | 2011/059536 A2 | 5/2011 |

OTHER PUBLICATIONS

Non-Final Office Action dated Jun. 8, 2023 issued in U.S. Appl. No. 17/214,708.

English Translation of Chinese Search Report dated Jan. 8, 2024 for the related Chinese Patent Application No. 202010834452.5.

* cited by examiner

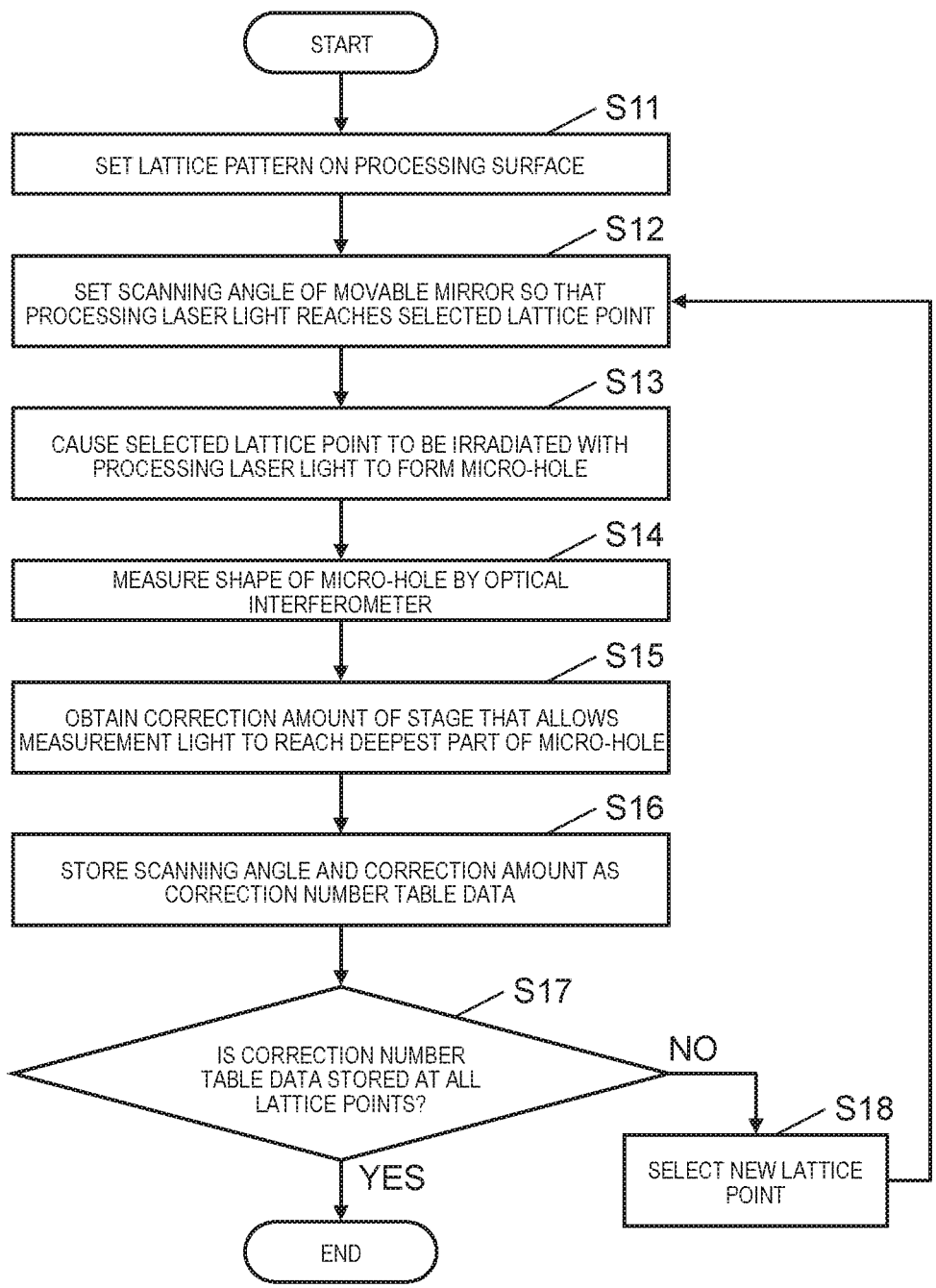

FIG. 8

| DATA NUMBER k | LASER OUTPUT DATA $L_k$ | PROCESSING POINT POSITION x | PROCESSING POINT POSITION y | SCANNING ANGLE $\phi x_k$ | SCANNING ANGLE $\phi y_k$ | CORRECTION AMOUNT $\psi x_k$ | CORRECTION AMOUNT $\psi y_k$ |
|---|---|---|---|---|---|---|---|
| 0 | $L_0$ | $x_0$ | $y_0$ | $\phi x_0$ | $\phi y_0$ | $\psi x_0$ | $\psi y_0$ |
| 1 | $L_1$ | $x_1$ | $y_1$ | $\phi x_1$ | $\phi y_1$ | $\psi x_1$ | $\psi y_1$ |
| 2 | $L_2$ | $x_2$ | $y_2$ | $\phi x_2$ | $\phi y_2$ | $\psi x_2$ | $\psi y_2$ |
| ⋮ | ⋮ | ⋮ | ⋮ | ⋮ | ⋮ | ⋮ | ⋮ |
| k-1 | $L_{k-1}$ | $x_{k-1}$ | $y_{k-1}$ | $\phi x_{k-1}$ | $\phi y_{k-1}$ | $\psi x_{k-1}$ | $\psi y_{k-1}$ |
| k | $L_k$ | $x_k$ | $y_k$ | $\phi x_k$ | $\phi y_k$ | $\psi x_k$ | $\psi y_k$ |
| k+1 | $L_{k+1}$ | $x_{k+1}$ | $y_{k+1}$ | $\phi x_{k+1}$ | $\phi y_{k+1}$ | $\psi x_{k+1}$ | $\psi x_{k+1}$ |
| ⋮ | ⋮ | ⋮ | ⋮ | ⋮ | ⋮ | ⋮ | ⋮ | ns
LASER PROCESSING APPARATUS, LASER PROCESSING METHOD, AND CORRECTION DATA GENERATION METHOD

CROSS-REFERENCE OF RELATED APPLICATIONS

This application claims the benefit of Japanese Application No. 2019-152889, filed on Aug. 23, 2019, the entire disclosure of which Application is incorporated by reference herein.

BACKGROUND

1. Technical Field

The present disclosure relates to a laser processing apparatus, a laser processing method, and a correction data generation method used for processing a workpiece.

2. Description of the Related Art

For example, PCT Japanese Translation Patent Publication No. 2018-501964 (hereinafter referred to as "Patent Document 1") discloses a laser processing apparatus. The laser processing apparatus uses optical coherence tomography (OCT) technology that visualizes an internal structure of a sample using an optical coherence tomography device and measures a depth of a keyhole generated during metal processing by laser light.

Hereinafter, the laser processing apparatus of Patent Document 1 will be described with reference to FIG. 16. FIG. 16 is a diagram schematically illustrating a configuration of the laser processing apparatus disclosed in Patent Document 1.

As illustrated in FIG. 16, laser light 107 for processing and measurement light 105 are introduced into welding head 108. Measurement light 105 passes through collimator module 106 and dichroic mirror 110, and has a coaxial configuration that shares a light axis with laser light 107 for processing.

The measuring device is configured with an OCT optical system using an optical coherence tomography device composed of analyzer 100, optical fiber 101, beam splitter 103, optical fiber 104, reference arm 102, and measurement arm 109. Measurement light 105 is emitted through optical fiber 104 as measurement light of the OCT optical system.

Laser light 107 for processing and measurement light 105 are condensed by condenser lens 111 and workpiece 112 is irradiated with laser light 107 for processing and measurement light 105. Workpiece 112 is processed by laser light 107 for processing. That is, when processing portion 113 of workpiece 112 is irradiated with condensed laser light 107 for processing, metal constituting workpiece 112 is melted. With this configuration, a keyhole is formed by pressure when the molten metal is evaporated. Then, the bottom surface of the keyhole is irradiated with measurement light 105.

In this case, an interference signal is generated according to an optical path difference between measurement light 105 (reflected light) reflected by the keyhole and light (reference light) on the reference arm 102 side. Then, a depth of the keyhole can be obtained from the interference signal. The keyhole, immediately after being formed, is filled with the surrounding molten metal. For that reason, the depth of the keyhole is substantially the same as the depth (hereinafter, referred to as "penetration depth") of the molten portion of a metal processing portion. With this configuration, the penetration depth of processing portion 113 can be measured.

In recent years, a laser processing apparatus that combines a galvano mirror and an fθ lens is known. The galvano mirror is a movable mirror that can control a direction in which laser light is reflected in detail. The fθ lens is a lens that condenses laser light on a processing point on the surface of the workpiece.

Accordingly, a configuration in which the method for measuring the depth of the keyhole disclosed in Patent Document 1 is applied to a laser processing apparatus in which the galvano mirror and the fθ lens are combined is conceivable, but in this case, the following problems occur. That is, since the laser light for processing and the measurement light have different wavelengths, chromatic aberration occurs in the fθ lens. As a result, a deviation occurs between irradiation positions of the laser light for processing and the measurement light on the surface of the workpiece. Therefore, there is a concern that the depth of the keyhole cannot be accurately measured with the measurement light.

SUMMARY

The present disclosure provides a laser processing apparatus, a laser processing method, and a correction data generation method capable of accurately measuring a depth of a keyhole.

According to one aspect of the present disclosure, there is provided a laser processing apparatus including a laser oscillator that oscillates laser light for processing with respect to a processing point on a surface of a workpiece and an optical interferometer that emits measurement light to the processing point and generates an optical interference intensity signal based on interference caused by an optical path difference between the measurement light reflected at the processing point and reference light. The laser processing apparatus includes a movable mirror that changes a traveling direction of the laser light for processing and a traveling direction of the measurement light, a stage that changes an incident angle of the measurement light to the movable mirror, a lens that condenses the laser light for processing and the measurement light on the processing point, and a memory that stores corrected data for processing. Furthermore, the laser processing apparatus includes a controller that controls the laser oscillator, the movable mirror, and the stage based on the corrected data for processing and a measurement processor based on the optical interference intensity signal that measures a depth of a keyhole generated at the processing point by being irradiated with laser light for processing. The corrected data for processing is data obtained by correcting data for processing generated in advance for processing the workpiece so that a deviation of an arrival position of at least one of the laser light for processing and the measurement light on the surface of the workpiece caused by chromatic aberration of the lens is eliminated.

According to another aspect of the present disclosure, there is provided a laser processing method performed by a laser processing apparatus including a movable mirror that changes a traveling direction of laser light for processing and a traveling direction of measurement light, a stage that changes an incident angle of the measurement light to the movable mirror, and a lens that condenses the laser light for processing and the measurement light on a processing point on a surface of a workpiece. In the laser processing method, the movable mirror and the stage are controlled based on corrected data for processing, and the workpiece is irradiated with the laser light for processing and the measurement light. Furthermore, in the laser processing method, a depth of a keyhole generated at the processing point by being irradiated with the laser light for processing is measured based on interference caused by an optical path difference between the measurement light reflected at the processing point and reference light. The corrected data for processing is data obtained by correcting data for processing generated in advance for processing the workpiece so that a deviation of an arrival position of at least one of the laser light for processing and the measurement light on the surface of the workpiece caused by chromatic aberration of a lens is eliminated.

According to another aspect of the present disclosure, there is provided a correction data generation method performed by a laser processing apparatus including a movable mirror that changes a traveling direction of laser light for processing and a traveling direction of measurement light, a stage that changes an incident angle of the measurement light to the movable mirror, and a lens that condenses the laser light for processing and the measurement light on a processing point on a surface of a workpiece. In the correction data generation method, data for processing, in which an output intensity of the laser light for processing and an operation amount of the movable mirror that causes the laser light for processing to reach a processing point are set, is generated for each processing point on the surface of the workpiece, and a first operation amount, which is an operation amount of the stage that causes the measurement light to reach the predetermined position, is calculated for each predetermined position on the surface of the workpiece. Furthermore, in the correction data generation method, a second operation amount, which is an operation amount of the stage that causes the measurement light to reach the processing point is calculated, based on the first operation amount, for each processing point. In the correction data generation method, corrected data for processing, which is obtained by correcting the data for processing so that a deviation of an arrival position of at which at least one of the laser light for processing and the measurement light reaches the workpiece, caused by chromatic aberration of the lens is eliminated, by adding the second operation amount to the data for processing, is generated.

According to the present disclosure, it is possible to provide a laser processing apparatus, a laser processing method, and a correction data generation method capable of accurately measuring the depth of the keyhole.

BRIEF DESCRIPTION OF THE DRAWINGS

FIG. 7 is a flowchart illustrating a second example of the method for creating the correction number table data;

FIG. 8 is a table illustrating an example of a configuration of corrected processing data;

DETAILED DESCRIPTION

Figure 1:
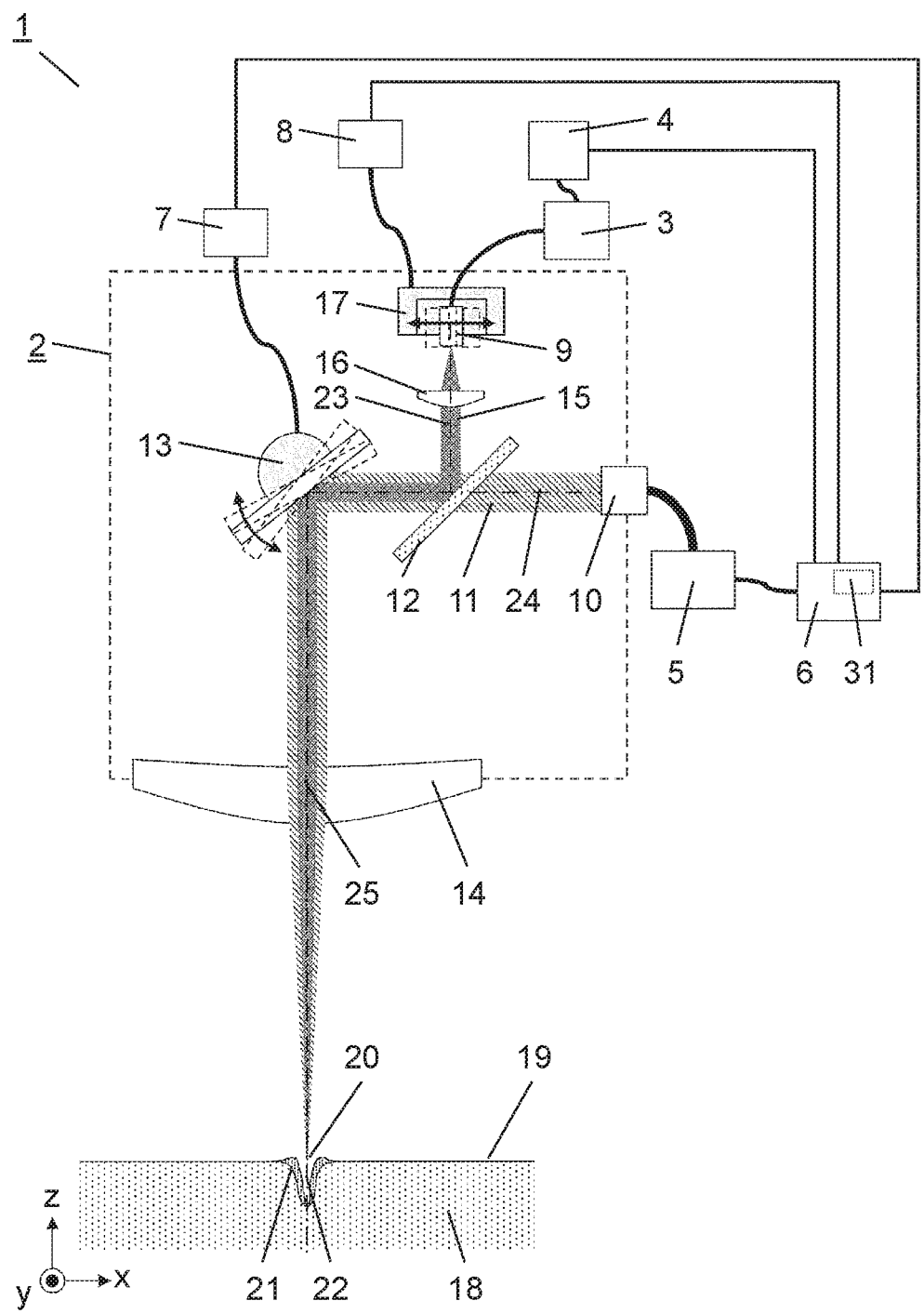
FIG. 1 is a diagram schematically illustrating a configuration of a laser processing apparatus according to an exemplary embodiment of the present disclosure.

Hereinafter, exemplary embodiments of the present disclosure will be described with reference to the drawings. The same reference numerals are given to the common constituent elements in each drawing, and the description thereof will be appropriately omitted.

Exemplary Embodiment

Hereinafter, a laser processing apparatus, a laser processing method, and a correction data generation method according to the exemplary embodiment of the present disclosure will be described by item by item.

(Configuration of Laser Processing Apparatus)

First, the configuration of laser processing apparatus 1 according to the exemplary embodiment of the present disclosure will be described with reference to FIG. 1.

FIG. 1 is a diagram schematically illustrating the configuration of laser processing apparatus 1 according to this exemplary embodiment.

As illustrated in FIG. 1, laser processing apparatus 1 according to this exemplary embodiment includes processing head 2, optical interferometer 3, measurement processor 4, laser oscillator 5, controller 6, first driver 7, second driver 8, and the like.

Optical interferometer 3 emits measurement light 15 for OCT measurement. Emitted measurement light 15 is input to processing head 2 through measurement light introducing port 9 installed on stage 17.

Laser oscillator 5 oscillates laser light 11 for processing for laser processing. Oscillated laser light 11 for processing is input to processing head 2 through processing light introducing port 10.

Laser light 11 for processing input to processing head 2 is transmitted through dichroic mirror 12 and is reflected by movable mirror 13. Reflected laser light 11 for processing is transmitted through lens 14 and is condensed on processing surface 19 on the surface of workpiece 18. With this configuration, processing point 20 on processing surface 19 of workpiece 18 is subjected to laser processing. In this case, processing point 20 irradiated with laser light 11 for processing is melted and molten pool 21 is formed. Molten metal is evaporated from formed molten pool 21. As a result, keyhole 22 is formed in workpiece 18 by the pressure of the vapor generated during evaporation.

On the other hand, measurement light 15 input to processing head 2 is converted into parallel light by collimator lens 16 and reflected by dichroic mirror 12. After that, reflected measurement light 15 is reflected by movable mirror 13, is transmitted through lens 14, and is condensed on processing point 20 on the surface of workpiece 18. Condensed measurement light 15 is reflected by the bottom surface of keyhole 22, and reaches optical interferometer 3 by going back along the propagation path. In this case, measurement light 15 optically interferes with reference light (not illustrated) in optical interferometer 3 to generate an interference signal.

Measurement processor 4 measures the depth of keyhole 22, that is, the penetration depth of processing point 20, from the interference signal generated by optical interferometer 3. The "penetration depth" means a distance between the top of a melted portion of workpiece 18 and processing surface 19.

Generally, a wavelength of laser light 11 for processing and a wavelength of measurement light 15 are different. In a case where a YAG laser or a fiber laser is used as laser light 11 for processing, the wavelength of laser light 11 for processing is 1064 nm. On the other hand, when a light source for OCT is used as measurement light 15, the wavelength of measurement light 15 is 1300 nm.

Dichroic mirror 12 has a characteristic of transmitting light having the wavelength of laser light 11 for processing and reflecting light having the wavelength of measurement light 15.

Movable mirror 13 is configured by a mirror that can rotate on two or more axes. Movable mirror 13 is, for example, a galvano mirror.

Stage 17 is configured by a movable stage that can be operated in parallel on two or more axes. Stage 17 is, for example, a piezo stage.

Movable mirror 13 and stage 17 are connected to controller 6 via first driver 7 and second driver 8, respectively, and operate under the control of controller 6. Specifically, first driver 7 operates movable mirror 13 based on an instruction from controller 6. Second driver 8 operates stage 17 based on the instruction from controller 6.

Controller 6 includes memory 31. Memory 31 stores processing data for performing desired processing on workpiece 18 and correction data for performing correction described below.

In FIG. 1, as an example, only the rotating operation of movable mirror 13 about a rotation axis in the y-direction is illustrated (see the dotted line portion and the double-headed arrow in the figure). However, actually, movable mirror 13 is configured to be capable of rotating on two or more axes, as described above. For that reason, movable mirror 13 can also rotate, for example, about the rotation axis in the x-direction.

In FIG. 1, as an example, only the operation of moving stage 17 in the x-direction is illustrated (see the dotted line portion in the figure). However, actually, stage 17 is configured to be capable of being operated in parallel on two or more axes, as described above. For that reason, stage 17 can also be operated in the y-direction, for example.

In the following, only the case where movable mirror 13 rotates about the rotation axis in the y-direction will be described for the sake of simplicity. Similarly, only the case where stage 17 operates in the x-direction will be described.

When stage 17 is at the origin position, as illustrated in FIG. 1, measurement light axis 23 of measurement light 15 is coincident with processing light axis 24 of laser light 11 for processing after measurement light 15 is reflected by dichroic mirror 12.

When movable mirror 13 is at the origin position, as illustrated in FIG. 1, processing light axis 24 of laser light 11 for processing is coincident with lens light axis 25 which is the center of lens 14 when laser light 11 for processing is transmitted through lens 14 after being reflected by movable mirror 13.

In the following, a position (corresponding to an irradiation position) at which laser light 11 for processing and measurement light 15 transmitted through the center of lens 14 reach processing surface 19 of workpiece 18 is referred to as "processing origin 26" (see FIG. 2). That is, the origin positions of movable mirror 13 and stage 17 are positions where laser light 11 for processing and measurement light 15 are transmitted through the center of lens 14.

Lens 14 is a lens for condensing laser light 11 for processing and measurement light 15 on processing point 20. Lens 14 is, for example, an fθ lens.

Movable mirror 13 and lens 14 constitutes a general optical scanning system including a galvano mirror and an fθ lens. Therefore, by rotating movable mirror 13 by a predetermined angle from the origin position, the arrival position at which laser light 11 for processing reaches processing surface 19 can be controlled. In the following, the angle at which movable mirror 13 is rotated from the origin position of movable mirror 13 will be referred to as an "operation amount of movable mirror 13". The operation amount of movable mirror 13 can be uniquely set if a positional relationship between optical members constituting processing head 2 and the distance from lens 14 to processing surface 19 are determined. With this configuration, the desired processing point 20 can be irradiated with laser light 11.

Here, it is preferable that the distance from lens 14 to processing surface 19 is such that a focal position at which laser light 11 for processing is most condensed and processing surface 19 are coincident with each other so that processing by laser light 11 for processing can be performed most efficiently. With this configuration, processing of workpiece 18 by laser light 11 for processing can be performed most efficiently. The distance from lens 14 to processing surface 19 is not limited thereto, and may be determined to be an appropriate arbitrary distance according to the application of processing.

Movable mirror 13 changes the operation amount of movable mirror 13 according to a predetermined operation schedule. With this configuration, it is possible to scan the position of the arbitrary processing point 20 on processing surface 19 to be irradiated with laser light 11 for processing.

Furthermore, controller 6 controls switching on and off of laser oscillator 5. With this configuration, laser processing can be performed with an arbitrary pattern on an arbitrary position on processing surface 19 within a range in which laser light 11 for processing can be scanned.

(Influence of Chromatic Aberration)

Next, the influence of a chromatic aberration of lens 14 will be described with reference to FIG. 2.

Figure 2:
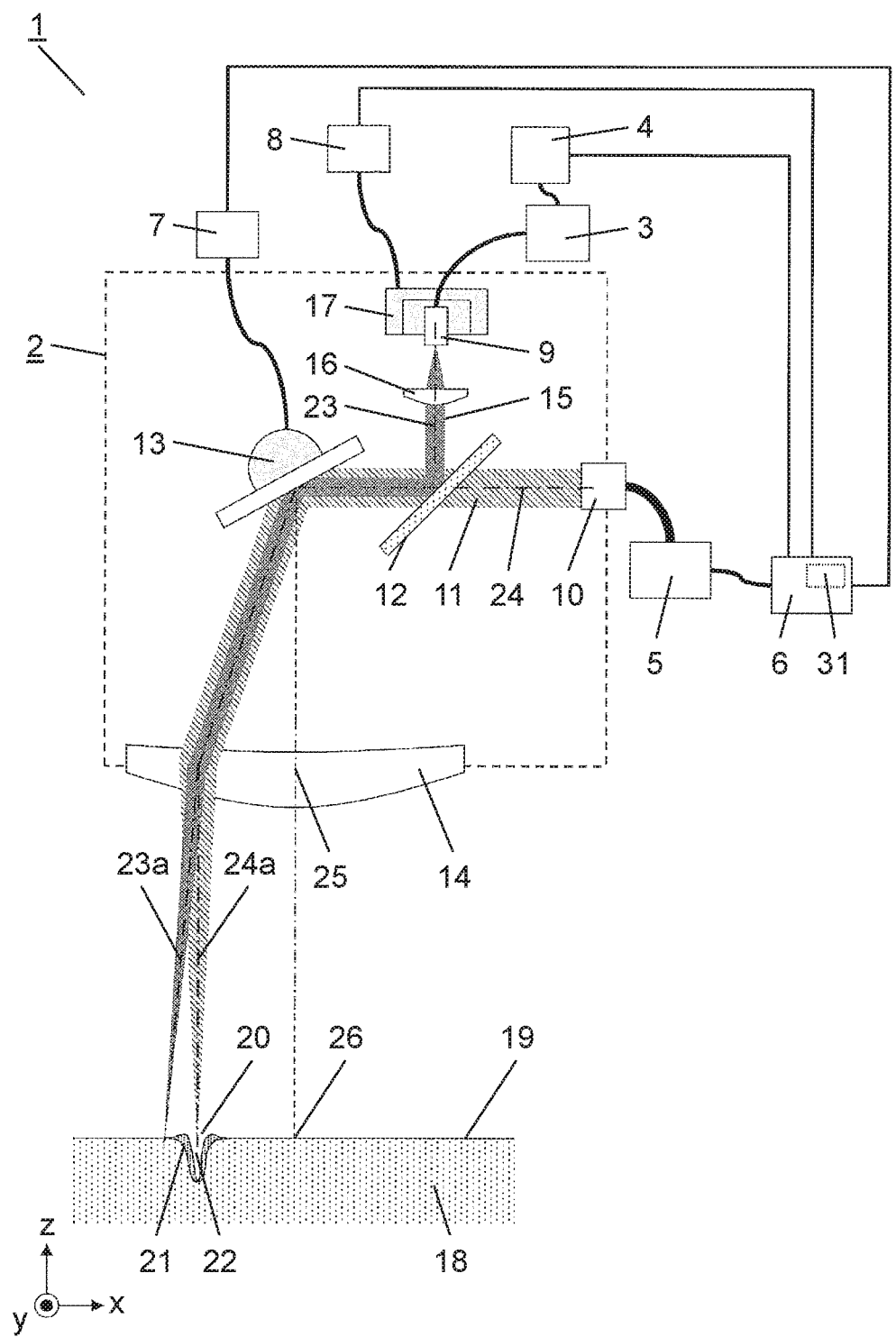
FIG. 2 is a diagram schematically illustrating the laser processing apparatus in a state where a movable mirror is operated from the origin position.

FIG. 2 is a diagram schematically illustrating laser processing apparatus 1 in a state where movable mirror 13 is operated from the origin position. In FIG. 2, it is assumed that stage 17 is at the origin position.

As illustrated in FIG. 2, laser light 11 for processing and measurement light 15 reflected by movable mirror 13 travel on the same light axis until laser light 11 for processing and measurement light 15 reach lens 14. However, after laser light 11 for processing and measurement light 15 transmitted through lens 14, a deviation occurs in the traveling directions of laser light 11 for processing and measurement light 15. That is, as illustrated in FIG. 2, processing light axis 24a, which is the light axis of laser light 11 for processing, and measurement light axis 23a, which is the light axis of measurement light 15, are deviated. Therefore, measurement light 15 reaches a position different from processing point 20.

This is due to the chromatic aberration of lens 14. Chromatic aberration is an aberration that occurs because a general optical material including lens 14 has a property of having different refractive indices with respect to the wavelength of light.

There are two types of chromatic aberration of axial chromatic aberration and magnification chromatic aberration. The axial chromatic aberration is an aberration due to the property that the focal position of the lens differs depending on the wavelength of light. On the other hand, the magnification chromatic aberration is an aberration due to the property that an image height on a focal plane (processing surface 19) differs depending on the wavelength of light. The deviation of the traveling directions of laser light 11 for processing (processing light axis 24a) and measurement light 15 (measurement light axis 23a) after being transmitted through lens 14 illustrated in FIG. 2 is caused by the magnification chromatic aberration described above.

In this case, axial chromatic aberration also occurs at the same time in laser processing apparatus 1 of this exemplary embodiment. However, the deviation between laser light 11 for processing and measurement light 15 due to the axial chromatic aberration can be dealt with by adjusting the distance between collimator lens 16 and measurement light introducing port 9. That is, it is possible to suppress an occurrence of axial chromatic aberration by causing collimator lens 16 to change measurement light 15 immediately after transmission from a parallel light state to a slightly divergent state or a convergent state.

In FIG. 2, when viewed from processing origin 26, the position at which measurement light 15 reaches processing surface 19 is farther than the position at which laser light 11 for processing reaches processing surface 19. However, the positional relationship described above is an example. That is, depending on a lens configuration of lens 14 and a size relationship between the wavelengths of laser light 11 for processing and measurement light 15, measurement light 15 may reach a position closer to processing origin 26 than laser light 11 for processing. In general, long-wavelength light reaches a position farther from processing origin 26.

As a method for correcting the magnification chromatic aberration, for example, there is a method in which lens 14 has the property of an achromatic lens. However, if lens 14 is to have both the property of an fθ lens and the property of an achromatic lens, a very advanced optical design technique is required. For that reason, it takes a lot of time and cost to design lens 14.

Therefore, in laser processing apparatus 1 according to this exemplary embodiment, as described below, stage 17 is operated (moved) to realize the correction of the magnification chromatic aberration at low cost.

(Magnification Chromatic Aberration Correction Method)

Next, a method for correcting the magnification chromatic aberration of lens 14 described above will be described with reference to FIG. 3.

Figure 3:
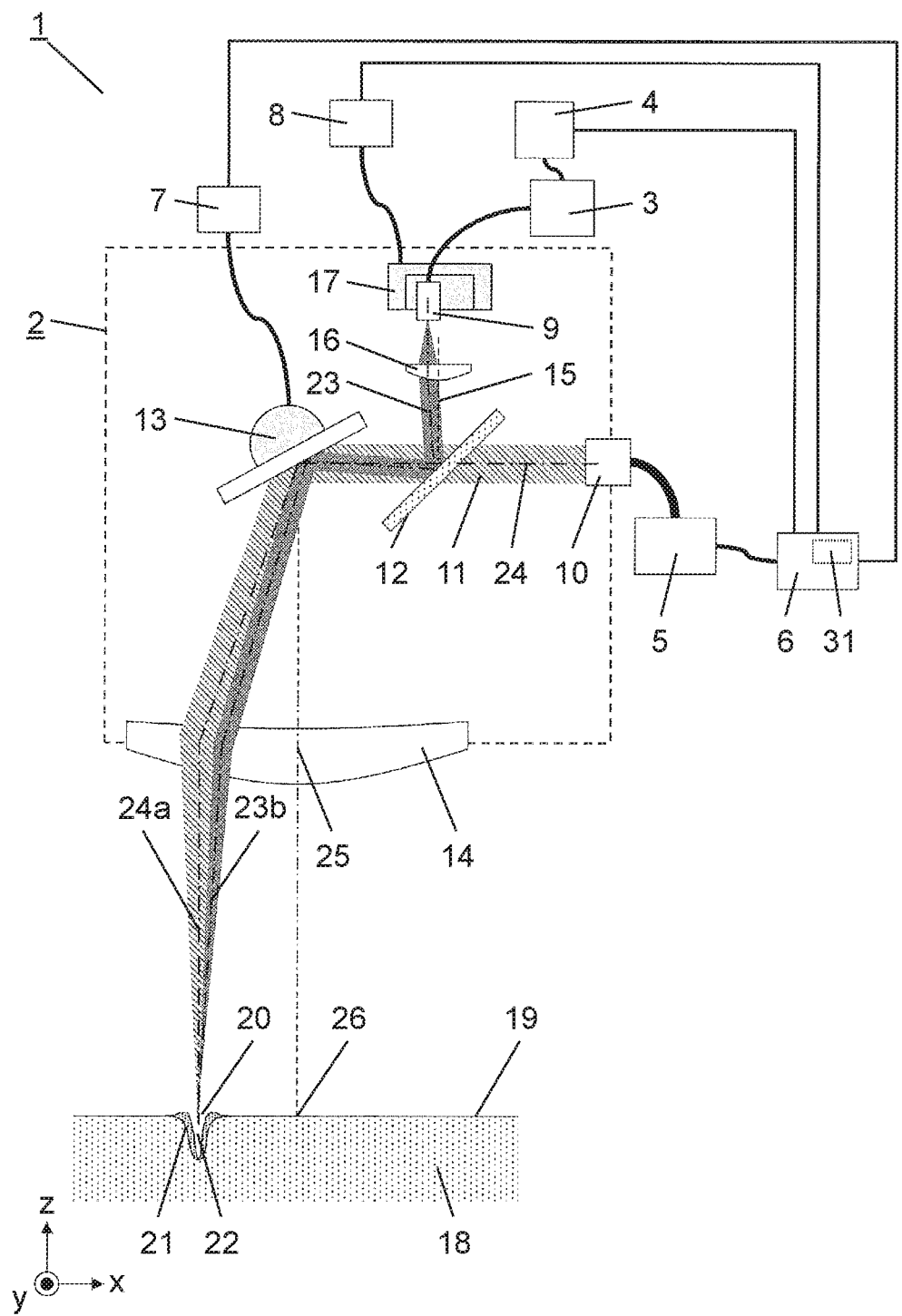
FIG. 3 is a diagram schematically illustrating the laser processing apparatus in a state where a deviation of an arrival position of each of laser light for processing and measurement light due to magnification chromatic aberration is corrected.

FIG. 3 is a diagram schematically illustrating laser processing apparatus 1 in a state where deviations of an arrival position of each of laser light 11 for processing and measurement light 15 due to magnification chromatic aberration are corrected.

In FIG. 3, stage 17 is operated by a predetermined operation amount (operation distance) from the origin position. With this configuration, as illustrated in FIG. 3, processing light axis 24 of laser light 11 for processing and measurement light axis 23 of measurement light 15 are not coaxial in a range from collimator lens 16 to lens 14. However, laser light 11 for processing and measurement light 15 that are transmitted through lens 14 respectively reach the same position on processing surface 19, that is, processing point 20.

In this case, as illustrated in FIG. 3, processing light axis 24a of laser light 11 for processing passes through the same position as processing light axis 24a illustrated in FIG. 2. On the other hand, measurement light axis 23b of measurement light 15 corrected by the operation of stage 17 described above passes through a position different from measurement light axis 23a illustrated in FIG. 2.

The operation amount of stage 17 (that is, an operation distance for operating stage 17 from the origin position of moving stage 17) is associated with the operation amount of movable mirror 13 in a one-to-one relationship. In this case, the operation amount of movable mirror 13 is uniquely determined by the position of processing point 20 which is irradiated with laser light 11 for processing (and measurement light 15). Therefore, the operation amount of stage 17 is also uniquely determined by the position of processing point 20 which is irradiated with measurement light 15.

In the following, the operation amount of stage 17 from the origin position will be referred to as a "correction amount" (corresponding to a "second instruction value" described later), and the method for obtaining the correction amount will be described.

(Relationship Between Stage Operation and Measurement Light Axis Angle)

Next, a mechanism for changing the angle of measurement light axis 23 by operating stage 17 from the origin position will be described with reference to FIG. 4.

Figure 4:
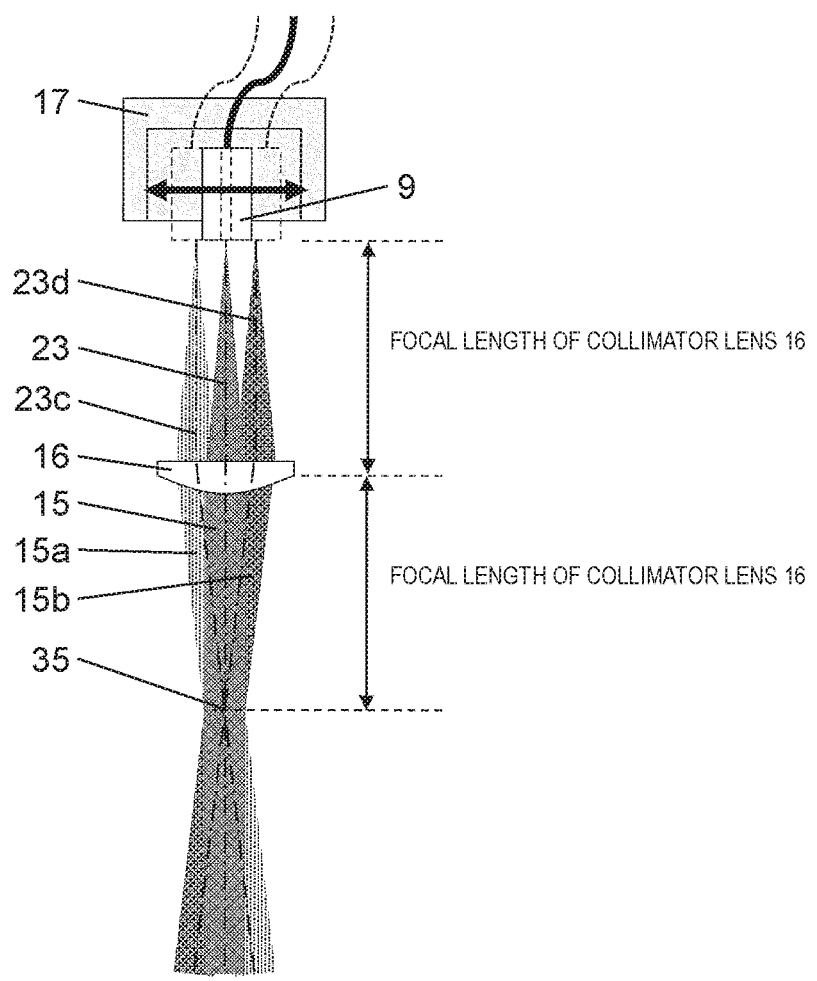
FIG. 4 is a diagram schematically illustrating a relationship among a stage, a measurement light introducing port and a collimator lens in the laser processing apparatus.

FIG. 4 is a diagram schematically illustrating the relationship between stage 17, measurement light introducing port 9, and collimator lens 16 in laser processing apparatus 1.

FIG. 4 illustrates a situation where the position of measurement light axis 23 changes according to the change in the position of measurement light introducing port 9 accompanying the operation of stage 17.

In FIG. 4, measurement light axis 23 is the measurement light axis in a case where stage 17 is at the origin position, and measurement light 15 is the measurement light at that time. Measurement light axis 23c is the measurement light axis in a case where stage 17 moves to the left side in the figure from the origin position, and measurement light 15a is the measurement light at that time. Furthermore, measurement light axis 23d is the measurement light axis in a case where stage 17 moves to the right side in the figure from the origin position, and measurement light 15b is the measurement light at that time.

An end portion of measurement light introducing port 9 for radiating measurement light 15 is disposed on the focal plane of collimator lens 16. Therefore, measurement light 15 radiated from measurement light introducing port 9 is converted into parallel light along measurement light axis 23 after passing through collimator lens 16. This also applies to measurement light 15a and measurement light 15b, and after passing through collimator lens 16, measurement light 15a and measurement light 15b are converted into parallel light along measurement light axes 23c and 23d.

On the other hand, as illustrated in FIG. 4, measurement light axis 23c and measurement light axis 23d in a case where stage 17 is moved from the origin position are refracted after passing through collimator lens 16, unlike measurement light axis 23. However, measurement light axes 23, 23c, and 23d are all in a light axis relationship that passes through focal position 35 of the collimator lens.

That is, the angle of measurement light axis 23 can be changed by moving stage 17.

(Relationship Between Correction Amount and Scanning Angle)

Next, the relationship between a correction amount of stage 17 and a scanning angle of movable mirror 13 will be described.

Here, the focal length of lens 14 is f, the angle of light incident on lens 14 from lens light axis 25 is $\theta$, and the distance (hereinafter, "image height") from the light axis on an image plane of a light beam transmitted through lens 14 is h. In this case, in lens 14 that is the f$\theta$ lens, the relationship of h=f$\theta$ is established.

As described above, movable mirror 13 has two axes on which movable mirror 13 rotate.

It is assumed that the two axes are the x-axis and the y-axis, an angle of the x-axis component from lens light axis 25 of light reflected by movable mirror 13 is $\theta$x and an angle of the y-axis component from lens light axis 25 of light reflected by movable mirror 13 is $\theta$y. In a case where the image heights in the x-direction and the y-direction on the image plane are x and y, respectively, the relationship of x=f$\theta$x and y=f$\theta$y is established. Accordingly, if the position of the processing point where laser light 11 for processing reaches processing surface 19 is (x, y), then (x, y)=(f$\theta$x, f$\theta$y).

An emission angle of the reflected light from movable mirror 13 when light is incident on movable mirror 13 changes with a twofold angle amount. Therefore, in a case where the operation amount of movable mirror 13 is ($\phi$x, $\phi$y), the relationship of (2$\phi$x, 2$\phi$y)=($\theta$x, $\theta$y) is established.

In the following description, the operation amount ($\phi$x, $\phi$y) of movable mirror 13 will be referred to as a "scanning angle" (corresponding to a "first instruction value" described later).

As described above, in laser processing apparatus 1 of this exemplary embodiment, when the scanning angle ($\phi$x, $\phi$y) of movable mirror 13 is determined, the arrival position of laser light 11 for processing on processing surface 19, that is, the position (x, y) of processing point 20 is also determined.

The scanning angle is uniquely determined by the position of processing point 20 as described above. Similarly, the correction amount of stage 17 is also uniquely determined by the position of processing point 20.

Therefore, in this exemplary embodiment, the relationship between the scanning angle and the correction amount is calculated in advance for each position of predetermined processing point 20. Then, during processing, stage 17 is operated by a correction amount corresponding to the position of processing point 20. With this configuration, it is possible to correct the deviation of the irradiation position of measurement light 15 with respect to the irradiation position of laser light 11 for processing due to the magnification chromatic aberration of lens 14 described above.

(Correction Number Table Data Creation Method)

Hereinafter, a method for creating the correction number table data will be described. The correction number table data is data (an example of corrected data for processing) illustrating the correspondence between the scanning angle and the correction amount for each processing point 20.

First, the trajectories of laser light 11 for processing and measurement light 15 on processing surface 19 of workpiece 18 will be described with reference to FIG. 5.

Figure 5:
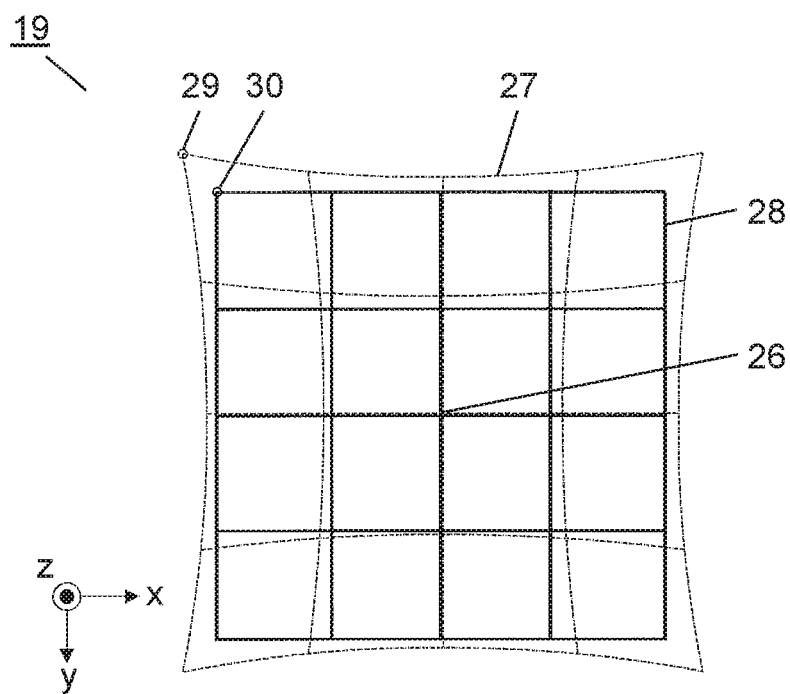
FIG. 5 is a diagram schematically illustrating trajectories of laser light for processing and measurement light on a processing surface in a case where only the movable mirror is operated to scan a surface of a workpiece in a lattice pattern.

FIG. 5 is a diagram schematically illustrating the trajectories of laser light 11 for processing and measurement light 15 on processing surface 19 in a case where processing surface 19 of workpiece 18 is scanned in a lattice pattern by operating only movable mirror 13 without operating stage 17.

Here, FIG. 5 illustrates a state where processing surface 19 is viewed from the lens 14 side. In FIG. 5, processing light trajectory 28 which is the trajectory of laser light 11 for processing is illustrated by a solid line, and measurement light trajectory 27 which is the trajectory of measurement light 15 is illustrated by a dotted line.

In the example illustrated in FIG. 5, stage 17 is not operated, and thus the trajectory in which the magnification chromatic aberration is not corrected is illustrated. Therefore, the trajectories of laser light 11 for processing and measurement light 15 are coincident with each other near processing origin 26. However, as the distance from processing origin 26 increases due to the magnification chromatic aberration, the deviation of the trajectories of laser light 11 for processing and measurement light 15 becomes larger. With this configuration, processing light trajectory 28 draws a lattice pattern without distortion. On the other hand, measurement light trajectory 27 draws a distorted pincushion trajectory. The shape of measurement light trajectory 27 illustrated in FIG. 5 is an example. That is, the distorted shape of measurement light trajectory 27 usually changes depending on optical characteristics of lens 14.

Similarly, the amount of positional deviation corresponding to each of processing light trajectory 28 and measurement light trajectory 27 also depends on the optical characteristics and the optical design of lens 14. As a general example, in a commercially available f$\theta$ lens having a focal length of lens 14 of 250 mm and a processing surface area of about 200 mm in diameter, a deviation of 0.2 mm to 0.4 mm occurs near the outermost periphery of the processing surface area.

In contrast, although the diameter of keyhole 22 (for example, see FIG. 1) generated by irradiating processing point 20 with laser light 11 for processing depends on the power and spatial coherency of the laser light for processing, and the light condensing capability of lens 14, the diameter of keyhole 22 is generally as small as 0.03 mm to 0.2 mm. As a result, measurement light 15 may not reach the bottom surface of keyhole 22 due to the positional deviation between laser light 11 for processing and measurement light 15 caused by the chromatic aberration of lens 14. Therefore, the penetration depth cannot be accurately measured with measurement light 15.

FIG. 5 illustrates, as an example, a lattice pattern of 4×4 cells at equal intervals, but the present disclosure is not limited to this lattice pattern. The lattice pattern for scanning may be set, for example, as a lattice pattern having a larger number of finer cells. Regarding characteristics of the magnification chromatic aberration characteristic of the fθ lens, particularly in a region where accuracy is required, a lattice interval of the lattice pattern may be narrowed. Furthermore, a radial lattice pattern may be set as the lattice pattern for scanning. However, in this exemplary embodiment, the correction amount is set on the two axes of the x-axis and the y-axis, and thus an orthogonal lattice pattern illustrated in FIG. 5 is more preferable.

When comparing processing light trajectory 28 and measurement light trajectory 27 illustrated in FIG. 5, it can be seen that a deviation occurs at each corresponding lattice point of the lattice pattern.

That is, in order to create the correction number table data, it is necessary to determine the correction amount so that processing light lattice point 30 which is one lattice point on processing light trajectory 28 and corresponding measurement light lattice point 29 of measurement light trajectory 27 are coincident with each other.

Hereinafter, a flow of the method for creating the correction number table data will be described.

First, a first example of the method for creating the correction number table data will be described with reference to FIG. 6.

Figure 6:
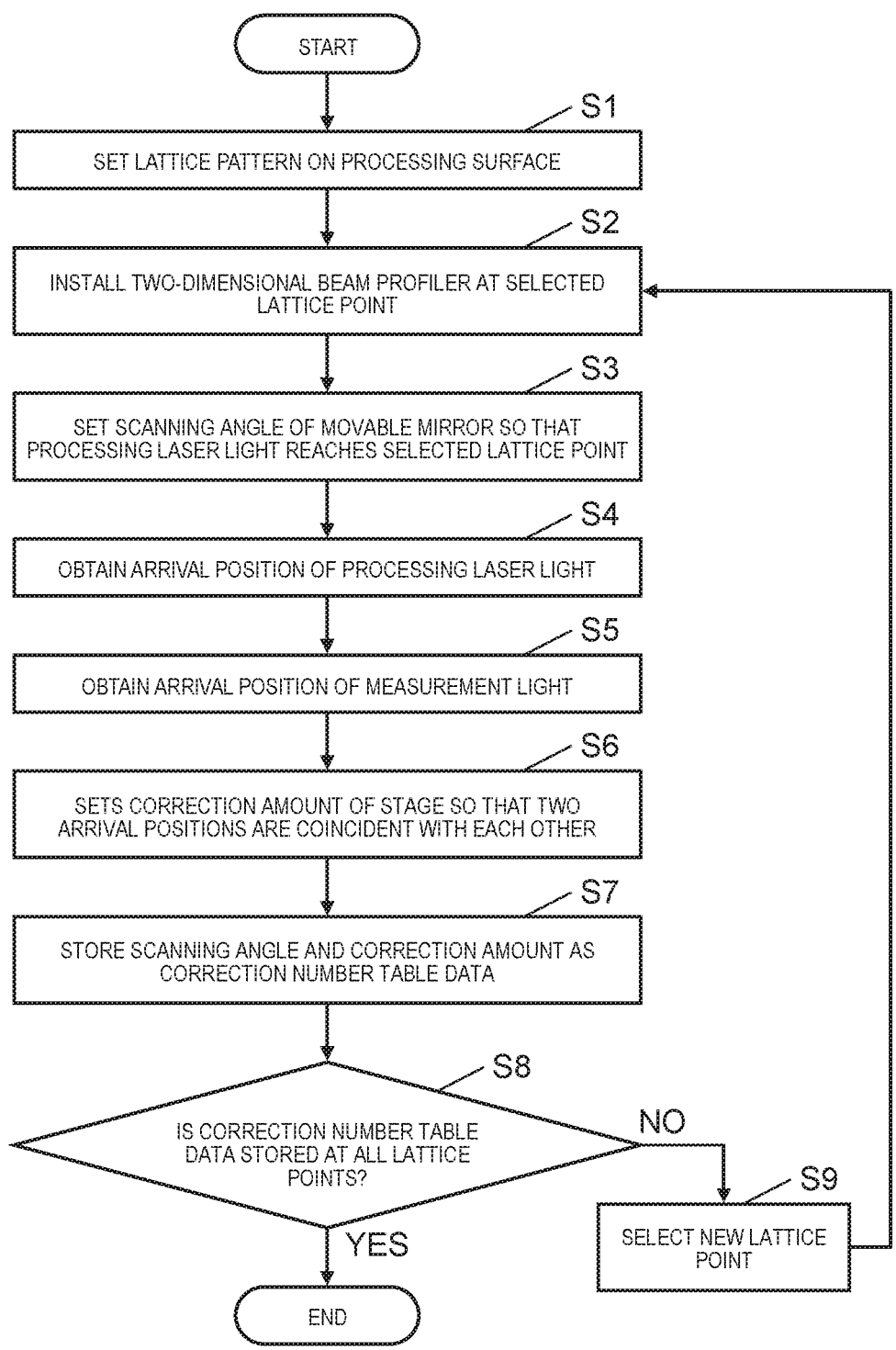
FIG. 6 is a flowchart illustrating a first example of a method for creating correction number table data.

FIG. 6 is a flowchart illustrating the first example of the method for creating correction number table data.

As illustrated in FIG. 6, first, controller 6 sets a lattice pattern (for example, processing light trajectory 28 illustrated in FIG. 5), which is a range in which laser processing is performed, on processing surface 19 of workpiece 18 (step S1). In this case, first, controller 6 selects one lattice point from a plurality of lattice points included in the lattice pattern.

Next, controller 6 installs a two-dimensional beam profiler (not illustrated) at the selected lattice point (step S2). In this case, the two-dimensional beam profiler is installed so that a height position of a detection surface is coincident with processing surface 19 of workpiece 18.

Next, controller 6 sets the scanning angle (first instruction value) which is the operation amount of movable mirror 13 so that laser light 11 for processing reaches the selected lattice point (step S3).

Next, controller 6 causes processing surface 19 to be irradiated with laser light 11 for processing. Then, controller 6 uses the two-dimensional beam profiler to obtain the position (hereinafter, referred to as an arrival position of laser light 11 for processing) at which laser light 11 for processing actually reaches processing surface 19 (step S4).

Next, controller 6 causes processing surface 19 to be irradiated with measurement light 15. Then, controller 6 uses the two-dimensional beam profiler to obtain the position (hereinafter, referred to as the "arrival position of measurement light 15") where measurement light 15 actually reaches processing surface 19 (step S5).

Next, controller 6 sets the correction amount (second instruction value) which is the operation amount of stage 17, while referring to the measurement result of the two-dimensional beam profiler, so that the arrival position of laser light 11 for processing and the arrival position of measurement light 15 are coincident with each other (step S6).

Next, controller 6 stores the scanning angle (first instruction value) set in step S3 and the correction amount (second instruction value) set in step S6 as correction number table data (corrected data for processing) in memory 31 (step S7).

Next, controller 6 determines whether or not the correction number table data is stored at all the lattice points of the lattice pattern (step S8). In this case, when it is determined that the correction number table data is stored at all the lattice points (YES in step S8), the flow ends.

On the other hand, when it is determined that the correction number table data is not stored at all the lattice points (NO in step S8), controller 6 selects one new lattice point (that is, a lattice point at which correction number table data is not stored) (step 9).

After that, the process returns to step S2, and the subsequent steps of the flow are similarly executed.

The first example of the method for creating the correction number table data has been described as above.

Next, a second example of the method for creating the correction number table data will be described with reference to FIG. 7.

FIG. 7 is a flowchart illustrating the second example of the method for creating correction number table data.

In the second example, for example, a metal flat plate (hereinafter, referred to as "metal plate") is used as a temporary workpiece.

As illustrated in FIG. 7, first, controller 6 sets a lattice pattern (for example, processing light trajectory 28 illustrated in FIG. 5), which is a range in which laser processing is performed, on processing surface 19 of the metal plate (step S11). In this case, controller 6 selects one lattice point from the plurality of lattice points included in the lattice pattern.

Next, controller 6 sets the scanning angle (first instruction value) which is the operation amount of movable mirror 13 so that laser light 11 for processing reaches the selected lattice point (step S12).

Next, controller 6 causes the selected lattice point to be irradiated with laser light 11 for processing to form a micro-hole on the surface of the metal plate (step S13). In this case, the output intensity and the irradiation time of laser light 11 for processing are adjusted so as not to penetrate the metal plate. The diameter of the micro-hole formed is preferably adjusted to about twice to three times measurement resolution of optical interferometer 3.

Next, controller 6 measures a shape of the formed micro-hole by optical interferometer 3 (step S14). In this case, stage 17 is operated (moved) to some extent from the origin position to scan measurement light 15. With this configuration, it is possible to measure a three-dimensional shape in the vicinity of the micro-hole.

Next, controller 6 uses data indicating the result measured in step S14 to obtain the correction amount (second instruction value), which is the operation amount of stage 17 that allows measurement light 15 to reach the deepest part of the micro-hole (step S15).

Next, controller 6 stores the scanning angle (first instruction value) set in step S12 and the correction amount (second instruction value) obtained in step S15 in the memory 31 as the correction number table data (corrected data for processing) (step S16).

Next, controller 6 determines whether or not the correction number table data is stored at all the lattice points of the lattice pattern (step S17). In this case, when it is determined that the correction number table data is stored at all the lattice points (YES in step S17), the flow ends.

On the other hand, when it is determined that the correction number table data is not stored at all the lattice points (NO in step S17), controller 6 selects one new lattice point (that is, a lattice point at which correction number table data is not stored) (step S18).

After that, the process returns to step S12, and the subsequent steps of the flow are similarly executed.

The second example of the method for creating the correction number table data has been described as above.

The correction number table data (corrected data for processing) can be obtained by the first example or the second example described as above. This correction number table data is referred to as a "first operation amount".

In the case where the lattice pattern set in step S1 of the first example or step S11 of the second example is the 4×4 lattice pattern illustrated in FIG. 5, only the correction number table data for sixteen grid points can be created. Accordingly, it is preferable to set a lattice pattern including sixteen or more lattice points and create more correction number table data. With this configuration, highly accurate correction number table data can be obtained.

However, even if many correction number table data are created, an operation angle (scanning angle) of movable mirror 13 can be set to any value within an operation range on the mechanism. For that reason, the scanning angle of movable mirror 13 may not coincident with the correction number table data. In this case, it is necessary to interpolate the correction number table data to obtain the correction amount.

A method for interpolating the correction number table data to obtain the correction amount will be described later.

(Processing Data Creation Method)

Next, a method for creating processing data for processing workpiece 18 will be described.

Conventionally, in a laser processing apparatus having an fθ lens and a galvano mirror, a controller controls a laser oscillator and the galvano mirror using a plurality of processing data set in time series. With this configuration, processing is performed in time series for each processing point on the surface of the workpiece. The processing data is, for example, data in which data items for an output instruction value to the laser oscillator and a scanning angle are set for each processing point.

However, in this exemplary embodiment, as the data item of the processing data used in laser processing apparatus 1, the correction amount described above (second instruction value) is added in addition to the output instruction value (laser output data) to laser oscillator 5, the position of processing point 20, and the scanning angle (first instruction value). Therefore, in the following, the processing data to which the correction amount is added as a data item will be described as "corrected processing data".

Hereinafter, an example of the corrected processing data will be described with reference to FIG. 8. FIG. 8 is a table illustrating an example of a configuration of corrected processing data.

As illustrated in FIG. 8, the corrected processing data includes, as a set of data items, data number k, laser output data $L_k$, processing point position $x_k$, processing point position $y_k$, scanning angle $\phi x_k$, scanning angle $\phi y_k$, correction amount $\psi x_k$, and correction amount $\psi y_k$.

Data number k indicates the order of processing data. Laser output data $L_k$ indicates an output instruction value to laser oscillator 5. Processing point position $x_k$ indicates the position of processing point 20 in the x-direction. Processing point position $y_k$ indicates the position of processing point 20 in the y-direction. Scanning angle $\phi x_k$ indicates the scanning angle of movable mirror 13 responsible for performing scanning in the x-direction. Scanning angle $\phi y_k$ indicates the scanning angle of movable mirror 13 responsible for performing scanning in the y-direction. The correction amount $\psi x_k$ indicates the correction amount of stage 17 responsible for correcting the position of measurement light 15 in the x-direction. The correction amount $\psi y_k$ indicates the correction amount of stage 17 responsible for correcting the position of measurement light 15 in the y-direction.

In FIG. 8, the subscript k attached to each data item other than data number k indicates that the data item to which the subscript k attached is a k-th data item where k is the data number. The scanning angle in the corrected processing data is an example of the "first instruction value" indicating the operation amount of the movable mirror, as described above. The correction amount in the corrected processing data is an example of the "second instruction value" indicating the operation amount of the stage, as described above.

An example of the configuration of the corrected processing data has been described as above.

Figure 9:
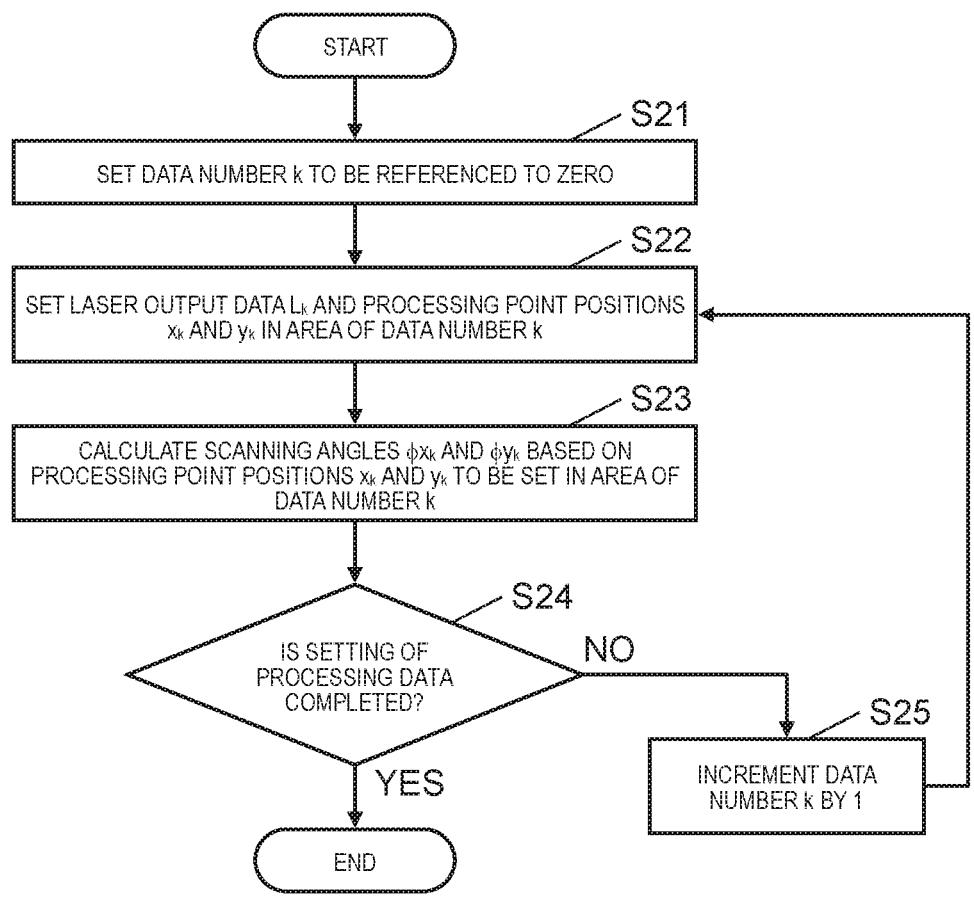
FIG. 9 is a flowchart illustrating a method for creating the corrected processing data.

Next, a flow of the method for creating data for processing will be described with reference to FIG. 9. FIG. 9 is a flowchart illustrating a method for creating the data for processing.

As illustrated in FIG. 9, first, controller 6 sets data number k to be referenced to zero (0) (step S21). Data number k is assigned to an area in memory 31 where the processing data is stored.

Next, controller 6 sets (stores) laser output data $L_k$ and processing point positions $x_k$ and $y_k$ in the area (memory position) of data number k in memory 31 (step S22). These values are set values which are set by the user of laser processing apparatus 1 using an operation unit (not illustrated) in order to realize desired laser processing. The operation unit is, for example, a keyboard, a mouse, a touch panel, or the like.

Next, controller 6 calculates scanning angles $\phi x_k$ and $\phi y_k$ of movable mirror 13 based on processing point positions $x_k$ and $y_k$ set in step S22. Controller 6 stores calculated scanning angles $\phi x_k$ and $\phi y_k$ in the area of data number k in memory 31 (step S23). Here, when the focal length of lens 14 is f, the processing point position and the scanning angle have the relationship of $(x_k, y_k)=(2f \cdot \phi x_k, 2f \cdot \phi y_k)$ as described above. Therefore, the scanning angle is automatically determined from the processing point position.

A relational expression between the processing point position and the scanning angle, a correspondence number table, and the like may be preset by the user. In this case, controller 6 may determine scanning angles $\phi x_k$ and $\phi y_k$ of movable mirror 13 using the relational expression between the processing point position and the scanning angle, the correspondence number table, or the like.

Next, controller 6 determines whether or not setting of the processing data is completed for all data numbers k (step S24). In this case, when it is determined that the setting of the processing data is completed for all data numbers k (YES in step S24), the flow ends.

On the other hand, when it is determined that the setting of the processing data is not completed for all data numbers k (NO in step S24), data number k to be referenced is incremented by 1 (step S25).

After that, the process returns to step S22, and the subsequent steps of the flow are similarly executed.

With the flow described as above, the processing data is set for all data numbers k.

(Correction Amount Setting Method)

Next, a method for setting the correction amount for each processing data set by the flow of FIG. 9 will be described.

First, the configuration of the correction number table data will be described with reference to FIG. 10.

Figure 10:
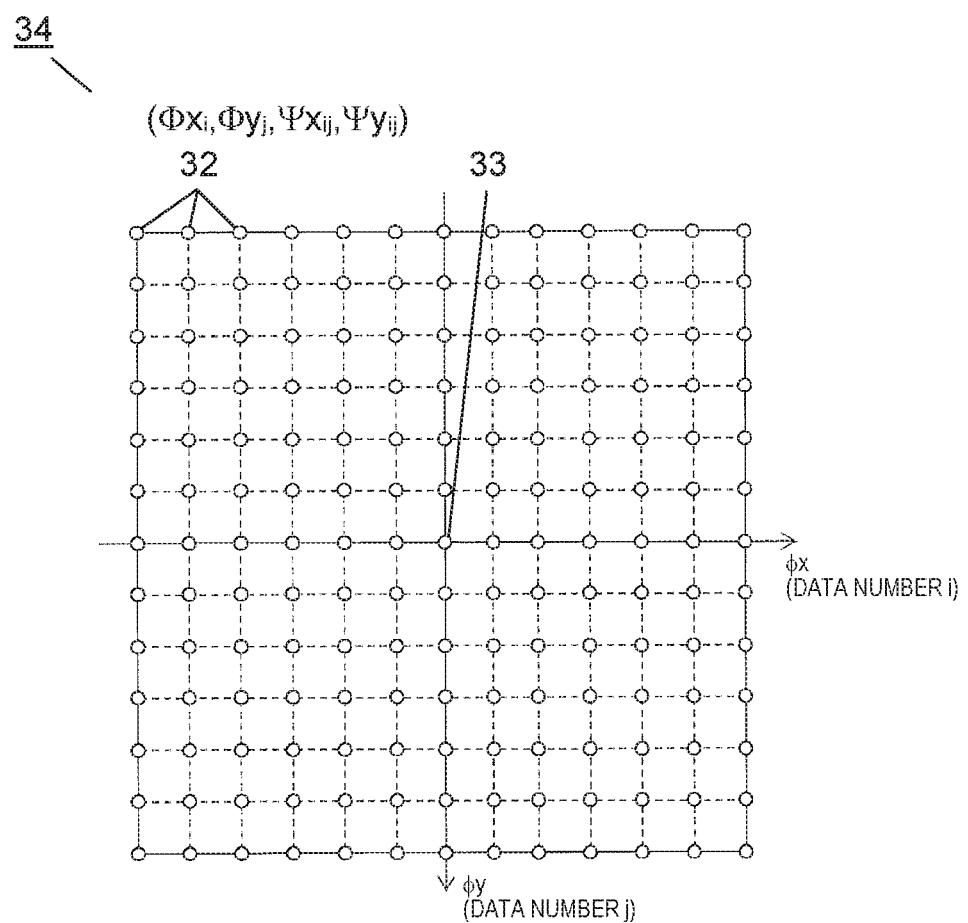
FIG. 10 is a diagram illustrating a correction number table that schematically represents a configuration of the correction number table data.

FIG. 10 is a diagram illustrating correction number table 34 schematically illustrating the configuration of the correction number table data.

FIG. 10 schematically illustrates the corrected processing data set for each lattice point on processing surface 19 as data points 32. As described above, each of data points 32 that is the corrected processing data includes a position (that is, processing point position) on processing surface 19, the scanning angle, and the correction amount. Correction data point 33 illustrated in FIG. 10 is a point corresponding to processing origin 26 on processing surface 19.

In the following description, the position of each data point 32 of correction number table 34 is indicated by a scanning angle (ϕx, ϕy) for convenience. The data number in the direction corresponding to scanning angle ϕx is i, and the data number in the direction corresponding to scanning angle ϕy is j. Each data point 32 stores (Φ$x_i$, Φ$y_j$, Ψ$x_{ij}$, Ψ$y_{ij}$) which is a set of a scanning angle (Φ$x_i$, Φ$y_j$) for the correction number table and a correction amount (Ψ$x_{ij}$, Ψ$y_{ij}$) for the correction number table. The scanning angle (Φ$x_i$, Φ$y_j$) for the correction number table includes an element of the scanning angle (ϕx, ϕy).

Next, a flow of a method for setting the correction amount will be described with reference to FIG. 11.

Figure 11:
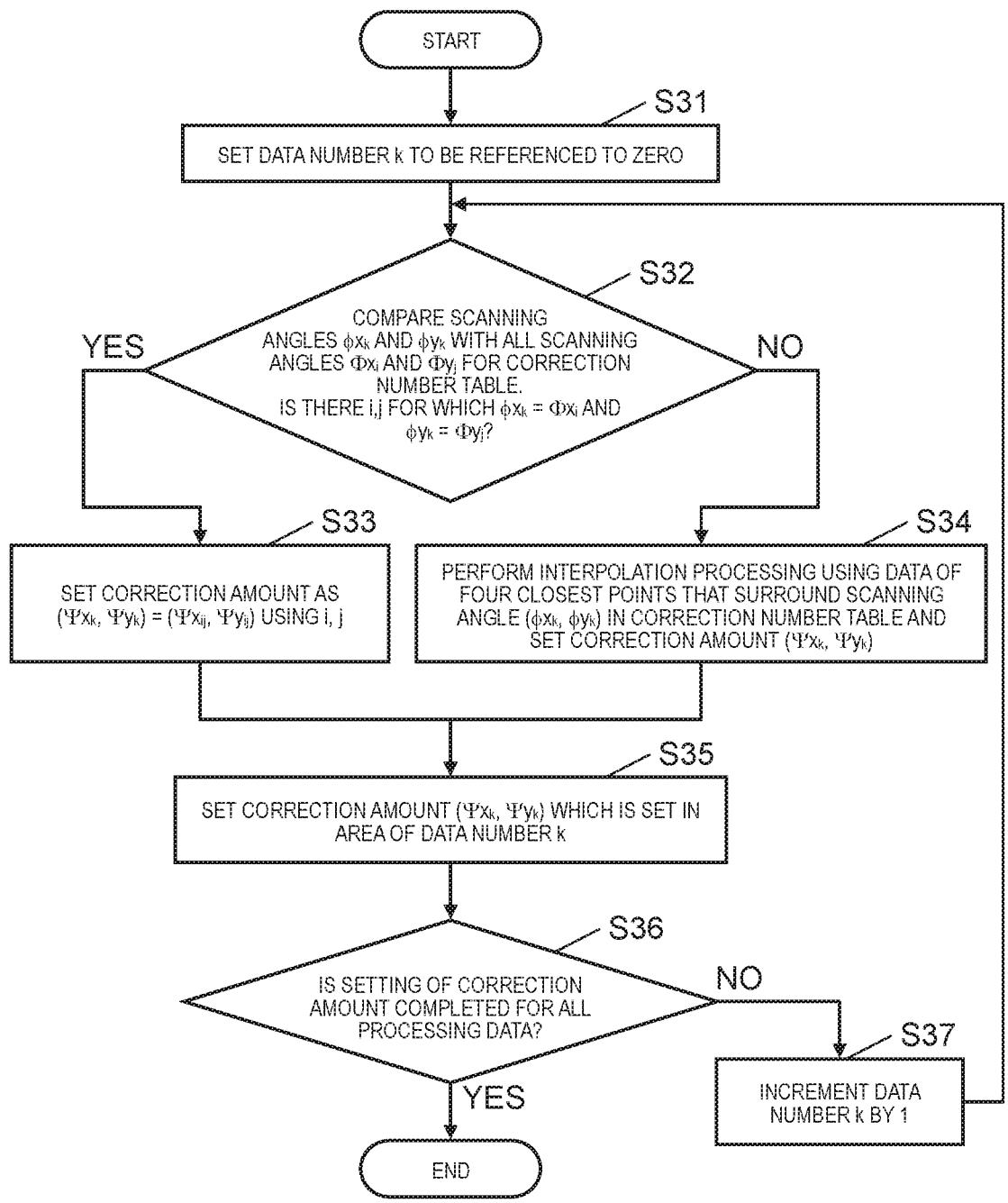
FIG. 11 is a flowchart illustrating a method for setting a correction amount.

FIG. 11 is a flowchart illustrating the method for setting the correction amount.

As illustrated in FIG. 11, first, controller 6 sets data number k to be referenced to zero (0) (step S31).

Next, controller 6 compares the scanning angle (ϕ$x_k$, ϕ$y_k$) stored in the area of data number k in memory 31 with all the scanning angles (Φ$x_i$, Φ$y_j$) for the correction number table within correction number table 34. Then, controller 6 determines whether or not there are data numbers i, j that satisfy ϕ$x_k$=Φ$x_i$ and ϕ$y_k$=Φ$y_j$ (step S32). In step S32, specifically, controller 6 determines whether or not there is a data item including a scanning angle exactly the same as the scanning angle set by the user in correction number table 34 illustrated in FIG. 10.

In this case, when it is determined that there are data numbers i, j that satisfy ϕ$x_k$=Φ$x_i$ and ϕ$y_k$=Φ$y_j$ (YES in step S32), controller 6 sets the correction amount as (φ$x_k$, φ$y_k$)=(Ψ$x_{ij}$, Ψ$y_{ij}$) using data numbers i, j that satisfy ϕ$x_k$=Φ$x_i$ and ϕ$y_k$=Φ$y_j$ (step S33). That is, in step S33, since there is a data item including the same scanning angle as the scanning angle set by the user, controller 6 sets the corresponding correction amount for the correction number table as the correction amount as it is.

On the other hand, when it is determined that there is no data numbers i, j that satisfy ϕ$x_k$=Φ$x_i$ and ϕ$y_k$=Φ$y_j$ (NO in step S32), controller 6 performs interpolation processing using data of the four closest points that surround the scanning angle (ϕ$x_k$, ϕ$y_k$) set by the user in correction number table 34, and sets the correction amount (φ$x_k$, φ$y_k$) (step S34). Details of step S34 will be described later.

Next, controller 6 sets (stores) the correction amount (ψ$x_k$, ψ$y_k$) set in step S33 or step S34 in the area of data number k of the processing data in memory 31 (step S35).

Next, controller 6 determines whether or not setting of the correction amount is completed for all the processing data stored in memory 31 (step S36). When it is determined that the setting of the correction amount is completed for all the processing data (YES in step S36), the flow ends.

On the other hand, when it is determined that the setting of the correction amount is not completed for all the processing data (NO in step S36), controller 6 increments data number k to be referenced to by 1 (step S37).

After that, the process returns to step S32, and the subsequent steps of the flow are similarly executed.

With the flow described as above, the corrected processing data is set for all data numbers k.

(Details of Interpolation Processing)

Next, interpolation processing in step S34 illustrated in FIG. 11 will be described in detail with reference to FIG. 12.

The interpolation processing in step S34 is executed when the scanning angle (ϕ$x_k$, ϕ$y_k$) set by the user is not coincident with any of the scanning angles for the correction number table (Φ$x_i$, Φ$y_j$) in data points 32.

Figure 12:
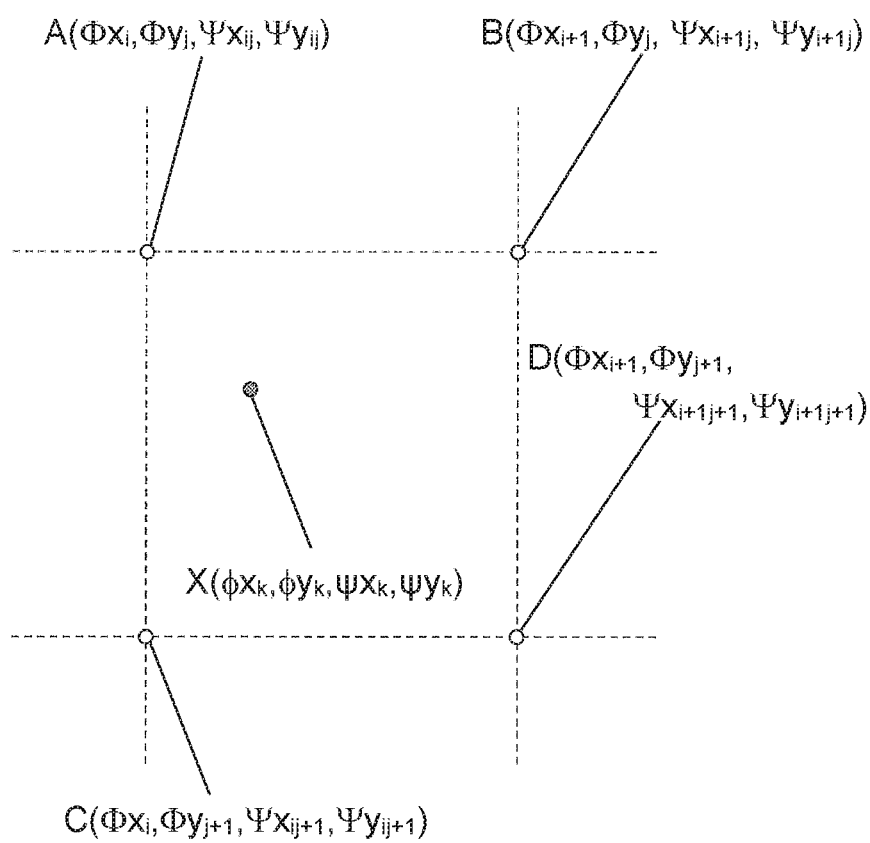
FIG. 12 is a diagram illustrating a relationship between a scanning angle X and correction data points around the scanning angle X in a case where the scanning angle X set by a user is not coincident with a scanning angle for correction number table of any data point on the correction number table.

FIG. 12 is a diagram illustrating a relationship between scanning angle X(ϕ$x_k$, ϕ$y_k$) set as the processing data by the user and the correction data points around scanning angle X(ϕ$x_k$, ϕ$y_k$) in the case where scanning angle X(ϕ$x_k$, ϕ$y_k$) is not coincident with the scanning angle (Φ$x_i$, Φ$y_j$) for the correction number table of any one of data points 32 of correction number table 34 illustrated in FIG. 10.

As illustrated in FIG. 12, the point corresponding to scanning angle X (ϕ$x_k$, ϕ$y_k$) is positioned within a lattice made up of four correction data points A(Φ$x_i$, Φ$y_j$, Ψ$x_{ij}$, Ψ$y_{ij}$), B(Φ$x_{i+1}$, Φ$y_j$, Ψ$x_{i+1j}$, Ψ$y_{i+1j}$), C(Φ$x_i$, Φ$y_{j+1}$, Ψ$x_{ij+1}$, Ψ$y_{ij+1}$), and D(Φ$x_{i+1}$, Φ$y_{j+1}$, Ψ$x_{i+1j+1}$, Ψ$y_{i+1j+1}$). In this case, the relationship of Φ$x_i$≤ϕ$x_k$≤Φ$x_{i+1}$ (equal sign is not satisfied at the same time) and Φ$y_j$≤ϕ$y_k$≤Φ$y_{j+1}$ (equals sign is not satisfied at the same time) are established.

Then, the correction amount (φ$x_k$, φ$y_k$) is obtained by the following expression (1) and expression (2) using the value of scanning angle X(ϕ$x_k$, ϕ$y_k$) and the values of the correction data points A, B, C, and D.

$$\varphi x_k = (E\Psi x_{ij} + F\Psi x_{i+1j} + G\Psi x_{ij+1} + H\Psi x_{i+1j+1})/J \qquad (1)$$

$$\varphi y_k = (E\Psi y_{ij} + F\Psi y_{i+1j} + G\Psi y_{ij+1} + H\Psi y_{i+1j+1})/J \qquad (2)$$

E, F, G, H, and J in the expression (1) and the expression (2) are obtained by the following expressions (3) to (7).

$$E = (\phi x_k - \Phi x_i)(\phi y_k - \Phi y_j). \qquad (3)$$

$$F = (\Phi x_{i+1} - \phi x_k)(\phi y_k - \Phi y_j). \qquad (4)$$

$$G = (\phi x_k - \Phi x_i)(\Phi y_{j+1} - \phi y_k). \qquad (5)$$

$$H = (\Phi x_{i+1} - \phi x_k)(\Phi y_{j+1} - \phi y_k). \qquad (6)$$

$$J = (\Phi x_{i+1} - \Phi x_i)(\Phi y_{j+1} - \Phi y_j) \qquad (7)$$

By the interpolation processing described above, the correction amount can be calculated based on the scanning angle set by the user.

In the interpolation processing described above, an example using a linear interpolation method is described, but is not limited thereto. As the interpolation processing, for example, a known two-dimensional interpolation method (spline interpolation, quadric surface approximation, and the like) may be used. As the interpolation processing, a high-order approximate continuous curved surface of the correction amount with respect to the scanning angle may be calculated in advance from the correction amount (Ψ$x_{ij}$, Ψ$y_{ij}$) for the correction number table on correction number table 34, and the correction amount corresponding to the scanning angle may be calculated. The correction amount calculated and obtained by the interpolation processing described above is referred to as a "second operation amount".

(Laser Processing Method)

Next, a flow of a laser processing method by laser processing apparatus 1 will be described with reference to FIG. 13.

Figure 13:
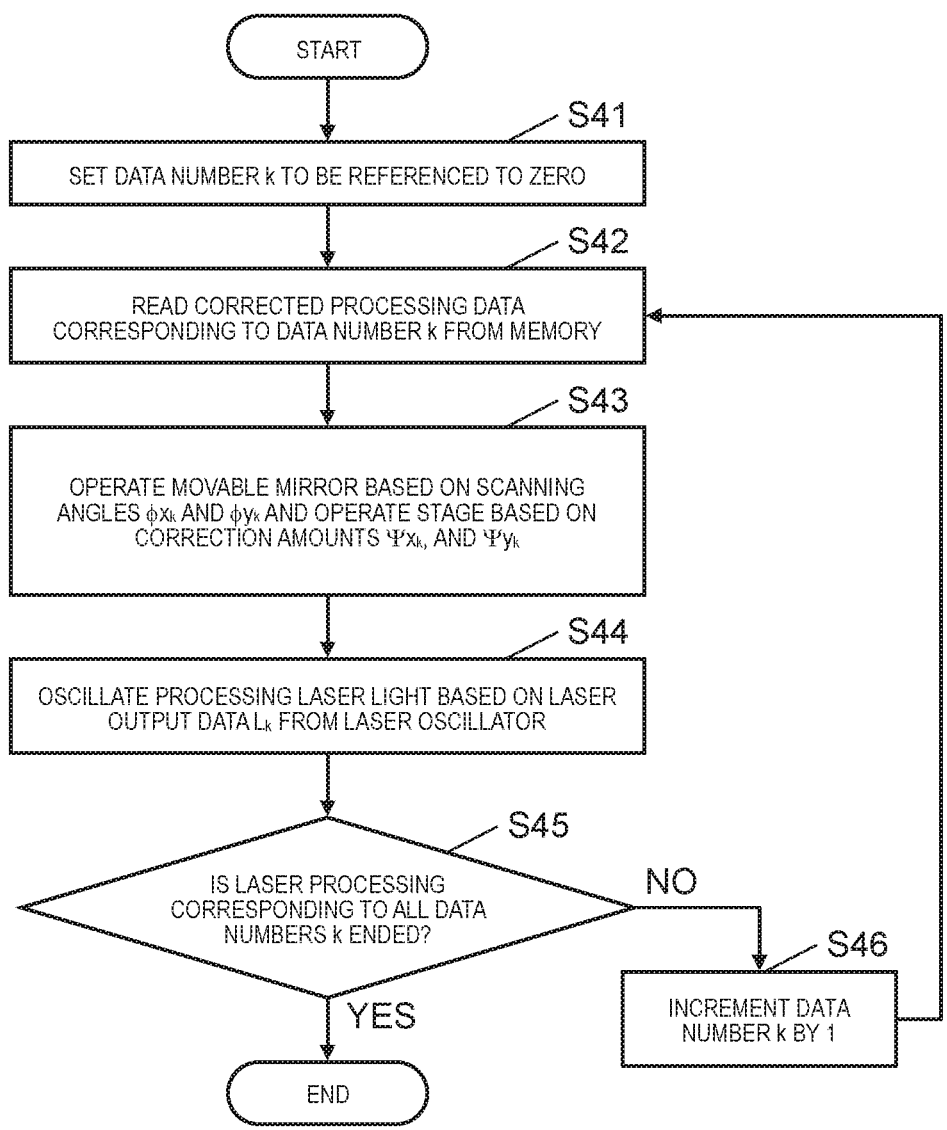
FIG. 13 is a flowchart illustrating a laser processing method.

FIG. 13 is a flowchart illustrating the laser processing method.

As illustrated in FIG. 13, first, controller 6 sets data number k to be referenced to zero (0) (step S41).

Next, controller 6 reads the corrected processing data (laser output data $L_k$, scanning angles $\phi x_k$ and $\phi y_k$, correction amounts $\varphi x_k$ and $\varphi y_k$) corresponding to data number k from memory 31 (step S42).

Next, controller 6 operates movable mirror 13 based on the scanning angle ($\phi x_k$, $\phi y_k$), and operates stage 17 based on the correction amount ($\varphi x_k$, $\varphi y_k$) (step S43).

Specifically, controller 6 notifies first driver 7 of the scanning angle ($\phi x_k$, $\phi y_k$). With this configuration, first driver 7 operates movable mirror 13 based on the scanning angle ($\phi x_k$, $\phi y_k$). Controller 6 notifies second driver 8 of the correction amount ($\varphi x_k$, $\varphi y_k$). With this configuration, second driver 8 operates stage 17 based on the correction amount ($\varphi x_k$, $\varphi y_k$).

Next, controller 6 transmits laser output data $L_k$ as the laser output value to laser oscillator 5. Then, controller 6 oscillates laser light 11 for processing based on laser output data $L_k$ from laser oscillator 5 (step S44).

Next, controller 6 determines whether or not laser processing corresponding to all data numbers k stored in memory 31 is ended (step S45). In this case, when it is determined that the laser processing corresponding to all data numbers k is ended (YES in step S45), the flow ends.

On the other hand, when it is determined that the laser processing corresponding to all data numbers k is not ended (NO in step S45), controller 6 increments data number k to be referenced by 1 (step S46).

After that, the process returns to step S42 and the subsequent steps of the flow are similarly executed.

With the flow described as above, laser processing is executed for all data numbers k.

(Keyhole Depth Measurement Method)

Next, a flow of the method for measuring the depth of keyhole 22 (for example, see FIG. 1) when the laser processing method described above is executed will be described with reference to FIG. 14.

Figure 14:
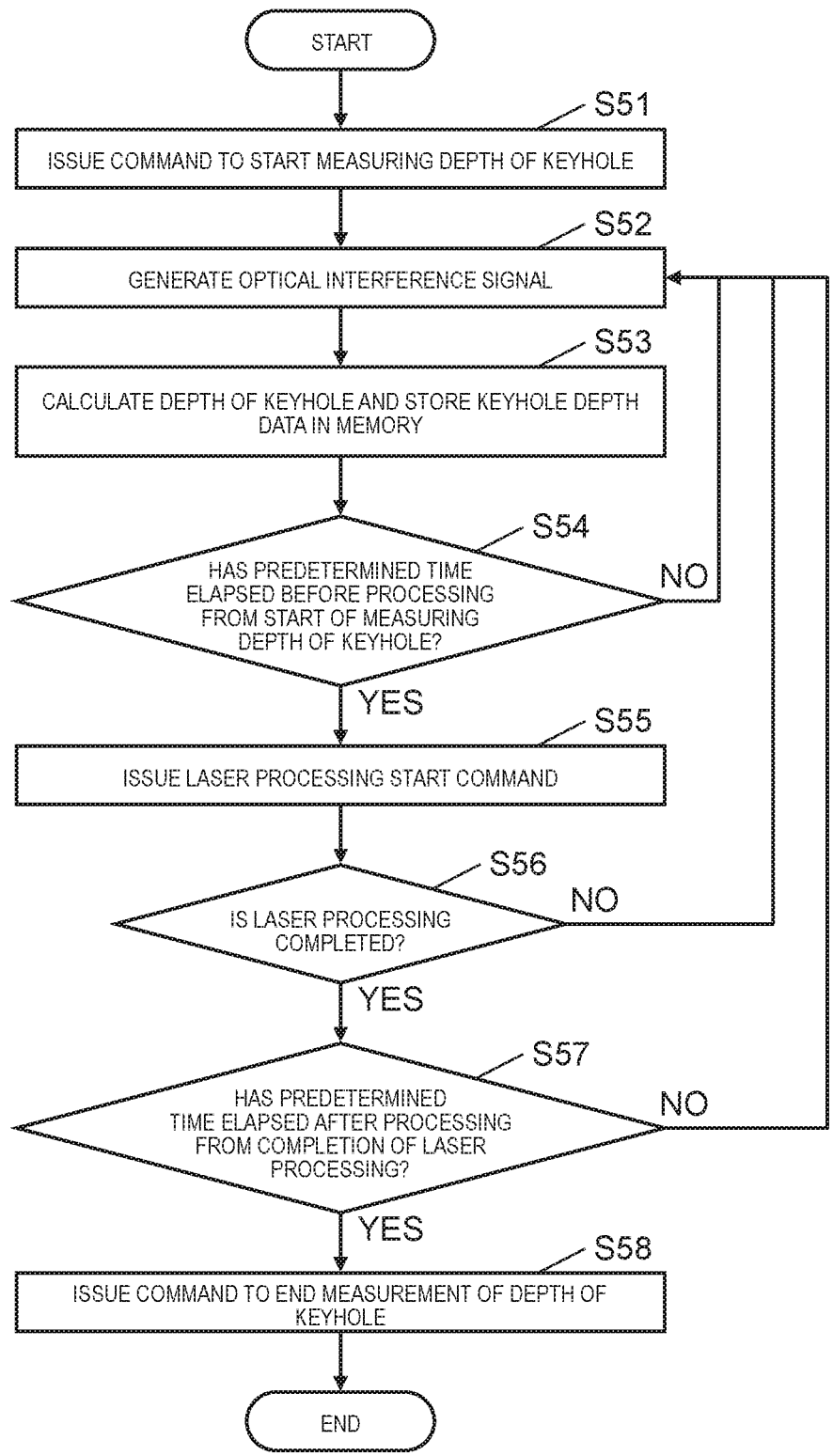
FIG. 14 is a flowchart illustrating a method for measuring a depth of a keyhole.

FIG. 14 is a flowchart illustrating the method for measuring the depth of keyhole 22.

As illustrated in FIG. 14, first, controller 6 issues a command to measurement processor 4 to start measuring the depth of keyhole 22 (step S51). As a result, measurement processor 4 emits measurement light 15 from optical interferometer 3 and starts measuring the depth of keyhole 22.

Next, measurement processor 4 generates an optical interference signal according to the optical path difference between measurement light 15 reflected and returned from keyhole 22 and reference light (step S52).

Next, measurement processor 4 calculates the depth of keyhole 22 (that is, the penetration depth) using the generated optical interference signal. Then, controller 6 stores data (hereinafter, referred to as "keyhole depth data") indicating the calculated depth of keyhole 22 in memory 31 (step S53).

Specifically, controller 6 stores data number k of the corrected processing data currently used and the keyhole depth data by being formed as a set in memory 31. In this case, in the case where laser processing is not started or the laser processing has already been ended, data number k is set to, for example, −1, and is stored in memory 31 together with the keyhole depth data. With this configuration, it is possible to indicate that workpiece 18 is in a non-processed state, or is the corrected processing data that is not used.

Separately from data number k, data indicating whether or not laser processing based on the corrected processing data is being performed may be separately stored in the memory 31 as flag data, together with the keyhole depth data and data number k of the corrected processing data in use by being formed as a set.

Next, controller 6 determines whether or not a predetermined time has elapsed before preset processing from the start of measuring the depth of keyhole 22 in step S51 (step S54). In this case, when it is determined that the predetermined time has not elapsed before processing (NO in step S54), the process returns to step S52 and the subsequent steps of the flow are similarly executed.

On the other hand, when it is determined that the predetermined time has elapsed before processing (YES in step S54), controller 6 issues a laser processing start command to laser oscillator 5, first driver 7, and second driver 8 (step S55). The laser processing start command includes the corrected processing data described above. That is, controller 6 notifies laser oscillator 5, first driver 7, and second driver 8 of the corrected processing data so as to execute the laser processing method illustrated in FIG. 13. With this configuration, each of laser oscillator 5, first driver 7, and second driver 8 performs an operation (see the description of FIG. 13 described above) based on the corrected processing data.

Next, controller 6 determines whether or not the laser processing is completed (step S56). In this case, as described with reference to FIG. 13, controller 6 sequentially advances the laser processing according to data number k of the corrected processing data. Then, in the case where the laser processing is ended based on the command including the corrected processing data corresponding to the last data number k, the laser processing is completed.

Then, when it is determined that the laser processing is not completed (NO in step S66), the process returns to step S52 and the subsequent steps are similarly executed.

On the other hand, when it is determined that the laser processing is completed (YES in step S56), controller 6 determines whether or not a predetermined time has elapsed after the preset processing from the time when the laser processing is completed (step S57).

In this case, when it is determined that the predetermined time has not elapsed after the processing (NO in step S57), the process returns to step S52 and the subsequent steps of the flow are similarly executed.

On the other hand, when it is determined that the predetermined time has elapsed after the processing (YES in step S57), controller 6 issues a command to measurement processor 4 to end the measurement of the depth of keyhole 22 (step S58). With this configuration, measurement processor 4 stops the emission of measurement light 15 from optical interferometer 3 and ends the measurement of the depth of keyhole 22.

According to the flow of the method for measuring the depth of keyhole 22 described above, the period during which laser processing is performed is always included in the period during which the depth of the keyhole is measured. With this configuration, position data of unprocessed processing surface 19 is recorded in a top portion and end portion of the keyhole depth data stored in memory 31. Therefore, it is convenient for analyzing the keyhole depth data such as comparing the depth of keyhole 22 with processing surface 19. This is because, when discussing quality of welding, information that one usually wants to know is the "penetration depth", which has a relationship of "penetration depth"≈"keyhole depth"="processing surface position (depth) during non-processing"–"keyhole depth during processing". For that reason, if evaluation is conducted with only the data obtained during processing, the "penetration depth" of the molten portion of the metal material may not be evaluated correctly. However, the "penetration depth" of the molten portion of the metal material can be correctly evaluated by the method for measuring the depth of keyhole 22 described above.

The command to start measuring the depth of keyhole 22 and the command to end measuring the depth of keyhole 22 need not be executed via controller 6 in particular, and may be commanded by the user using an operation unit (not illustrated) or the like.

(Effect)

As described above, laser processing apparatus 1 according to this exemplary embodiment includes laser oscillator 5 that oscillates laser light 11 for processing with respect to processing point 20 to be processed on the surface (processing surface 19) of workpiece 18. Laser processing apparatus 1 includes optical interferometer 3 that emits measurement light 15 to processing point 20 and generates an optical interference intensity signal based on interference caused by the optical path difference between measurement light 15 reflected at processing point 20 and reference light. Furthermore, laser processing apparatus 1 includes movable mirror 13 that changes the traveling direction of laser light 11 for processing and the traveling direction of measurement light 15, stage 17 that changes an incident angle of measurement light 15 to movable mirror 13, and lens 14 that condenses laser light 11 for processing and measurement light 15 on the processing point. Laser processing apparatus 1 includes memory 31 that stores corrected data for processing used for processing workpiece 18, which is corrected in advance and obtained by correcting data for processing so that a deviation of an arrival position of at least one of laser light for processing 11 and measurement light 15 on the surface of workpiece 18 caused by chromatic aberration of lens 14 is eliminated. Furthermore, laser processing apparatus 1 includes controller 6 that controls laser oscillator 5, movable mirror 13, and stage 17 based on the corrected data for processing and measurement processor 4 that measures the depth of keyhole 22 generated at the processing point by laser light 11 for processing.

With this configuration, it is possible to correct the deviation of the arrival position of laser light 11 for processing and the arrival position of measurement light 15 on processing surface 19 after being transmitted through lens 14, which is caused by the magnification chromatic aberration of lens 14. As a result, measuring the depth of the keyhole 22 by OCT can be appropriately performed. As a result, the depth of the keyhole can be measured more accurately.

Hereinafter, the correction result of the magnification chromatic aberration of lens 14 in laser processing apparatus 1 having the configuration described above will be described with reference to FIG. 15.

Figure 15:
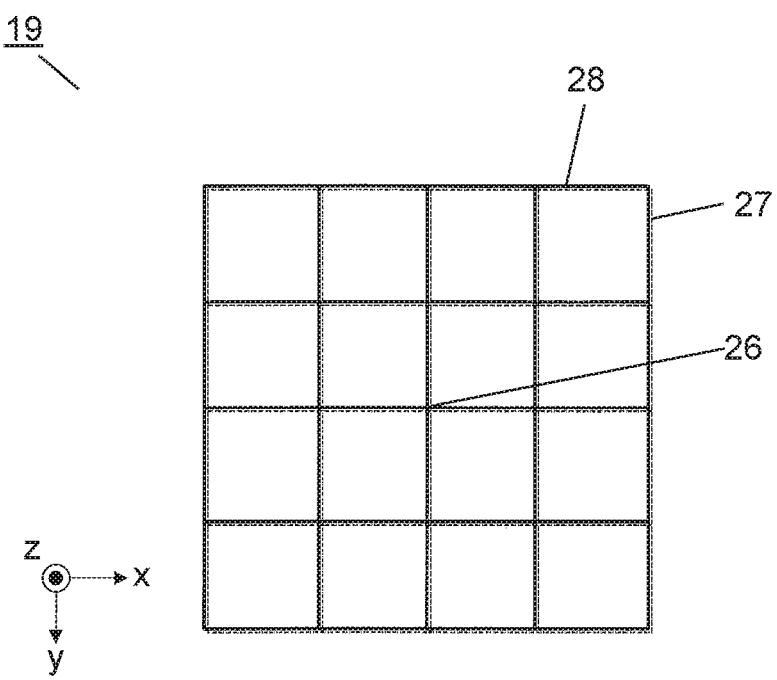
FIG. 15 is a diagram schematically illustrating trajectories of the laser light for processing and the measurement light on a processing surface in a state where the influence of the magnification chromatic aberration is corrected by an operation of the stage.
Figure 16:
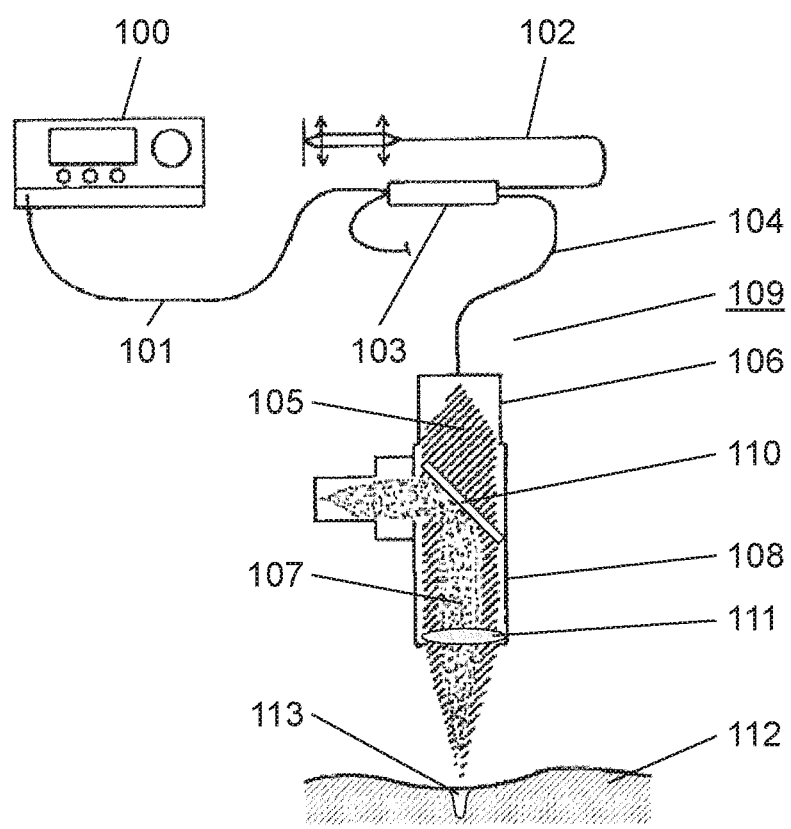
FIG. 16 is a diagram schematically illustrating a laser processing apparatus disclosed in Patent Document 1.

FIG. 15 is a diagram illustrating an example of the trajectories of laser light 11 for processing and measurement light 15 on processing surface 19 in a state where the influence of magnification chromatic aberration due to the operation of stage 17 is corrected.

As illustrated in FIG. 15, it can be seen that, by the correction described above, processing light trajectory 28 which is the trajectory of laser light 11 for processing, measurement light trajectory 27 which is the trajectory of measurement light 15, and each lattice point are coincident with each another, unlike FIG. 5.

In the exemplary embodiment described above, a configuration using stage 17 that is a piezo stage in order to change the light axis direction of measurement light 15 has been described as an example, but the present disclosure is not limited the configuration. That is, as the stage, for example, a configuration in which measurement light introducing port 9 is installed, and the light axis position of measurement light 15 radiated from measurement light introducing port 9 and directed to collimator lens 16 under the control of controller 6 can be changed by parallel movement within a plane perpendicular to measurement light axis 23 may be allowed. Therefore, the stage used in laser processing apparatus 1 may be configured by, for example, a stepping motor stage, a servo motor stage, an ultrasonic motor stage, or the like.

The present disclosure is not limited to the description of the exemplary embodiments described above, and various modifications may be made to the exemplary embodiments without departing from the spirit of the present disclosure.

What is claimed is:

1. A laser processing apparatus comprising:
    a laser oscillator that oscillates laser light for processing with respect to a processing point on a surface of a workpiece;
    an optical interferometer that emits measurement light to the processing point and generates an optical interference intensity signal based on interference caused by an optical path difference between the measurement light reflected at the processing point and reference light;
    a movable mirror that changes a traveling direction of the laser light for processing and a traveling direction of the measurement light;
    a stage that changes an incident angle of the measurement light to the movable mirror; a lens that condenses the laser light for processing and the measurement light on the processing point;
    a memory that stores corrected data for processing;
    a controller that controls the laser oscillator, the movable mirror, and the stage based on the corrected data for processing; and
    a measurement processor based on the optical interference intensity signal that measures a depth of a keyhole generated at the processing point by irradiation with the laser light for processing,
    wherein the corrected data for processing is data obtained by correcting data for processing generated in advance for processing the workpiece so that a deviation of an arrival position of at least one of the laser light for processing and the measurement light on the surface of the workpiece caused by chromatic aberration of the lens is eliminated.

2. The laser processing apparatus of claim 1, wherein the corrected data for processing includes
    an output instruction value which indicates an intensity of the laser light for processing oscillated from the laser oscillator and is preset for each being the processing point,
    a first instruction value indicating an operation amount of the movable mirror, and
    a second instruction value indicating an operation amount of the stage.

3. The laser processing apparatus of claim 1,
    wherein a wavelength of the laser light for processing and a wavelength of the measurement light are different from each other.

4. The laser processing apparatus of claim 1, wherein the movable mirror is a galvano mirror and the stage is a piezo stage.

5. The laser processing apparatus of claim 1, wherein the lens is an fθ lens.

6. The laser processing apparatus of claim 1, wherein:

the controller is configured to set a lattice pattern which is a range in which laser processing is performed, the controller is configured to select one lattice point from a plurality of lattice points included in the lattice pattern, the controller is configured to install a two-dimensional beam profiler at the selected lattice point, the controller is configured to set the scanning angle which is an operation amount of movable mirror as a first instruction value, the controller is configured to use the two-dimensional beam profiler to obtain the position at which laser light for processing reaches processing surface, the controller is configured to causes the processing surface to be irradiated with measurement light and uses the two-dimensional beam profiler to obtain the position where measurement light reaches the processing surface, the controller is configured to set a correction amount as a second instruction value which is the operation amount of stage, while referring to the measurement result of the two-dimensional beam profiler, so that the arrival position of laser light for processing and the arrival position of measurement light are coincident with each other, and the controller is configured to stores the first instruction value and the second instruction value as a corrected data for processing in the memory.

7. The laser processing apparatus of claim 1, wherein the optical interferometer emits the measurement light for optical coherence tomography (OCT) measurement.

8. The laser processing apparatus of claim 7, wherein wavelength of the measurement light is longer than wavelength of the laser light for processing.

9. The laser processing apparatus of claim 8, wherein wavelength of the measurement light is 1300 nm.

* * * * *